United States Patent
Kuroda et al.

(10) Patent No.: US 6,658,403 B1
(45) Date of Patent: Dec. 2, 2003

(54) APPARATUS AND METHOD FOR MANAGING ELECTRONIC ORIGINAL DATA

(75) Inventors: Yasutsugu Kuroda, Kawasaki (JP); Takashi Yoshioka, Kawasaki (JP); Etsuo Ono, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 466 days.

(21) Appl. No.: 09/639,762

(22) Filed: Aug. 15, 2000

(30) Foreign Application Priority Data

Oct. 15, 1999 (JP) .......................................... 11-293544

(51) Int. Cl.⁷ .............................................. G06F 17/30
(52) U.S. Cl. ...................... 707/2; 707/1; 707/9; 707/10
(58) Field of Search .................. 707/1–10, 100–104.1, 707/200–205; 715/5, 11, 500; 713/155–158, 165–168, 175–178, 200–202

(56) References Cited

U.S. PATENT DOCUMENTS

| | | | | |
|---|---|---|---|---|
| 5,509,074 A | * | 4/1996 | Choudhury et al. ........ | 713/176 |
| 5,765,152 A | * | 6/1998 | Erickson ..................... | 707/9 |
| 5,872,849 A | * | 2/1999 | Sudia .......................... | 713/175 |
| 5,897,643 A | * | 4/1999 | Matsumoto .................. | 715/511 |
| 5,937,069 A | * | 8/1999 | Nagai et al. ................. | 713/162 |
| 5,949,879 A | * | 9/1999 | Berson et al. ............... | 713/179 |
| 6,108,420 A | * | 8/2000 | Larose et al. ................ | 705/59 |
| 6,237,096 B1 | * | 5/2001 | Bisbee et al. ............... | 713/178 |
| 6,314,521 B1 | * | 11/2001 | Debry ......................... | 713/201 |
| 6,453,353 B1 | * | 9/2002 | Win et al. ................... | 709/229 |
| 6,512,915 B2 | * | 1/2003 | Matsunoshita et al. ..... | 399/366 |
| 6,513,117 B2 | * | 1/2003 | Tarpenning et al. ........ | 713/156 |

FOREIGN PATENT DOCUMENTS

| | | | | |
|---|---|---|---|---|
| JP | 07271903 A | * | 10/1995 | ............ G06K/9/20 |
| JP | 09062611 A | * | 3/1997 | ............ G06F/13/28 |

\* cited by examiner

*Primary Examiner*—Greta Robinson
*Assistant Examiner*—Linh Black
(74) *Attorney, Agent, or Firm*—Staas & Halsey LLP

(57) ABSTRACT

An electronic document is registered as electronic original data in an apparatus different from the computer environment of a user. At this time, a registration certificate for uniquely identifying the electronic original data is issued, and the user accesses the electronic original data using the issued registration certificate.

18 Claims, 28 Drawing Sheets

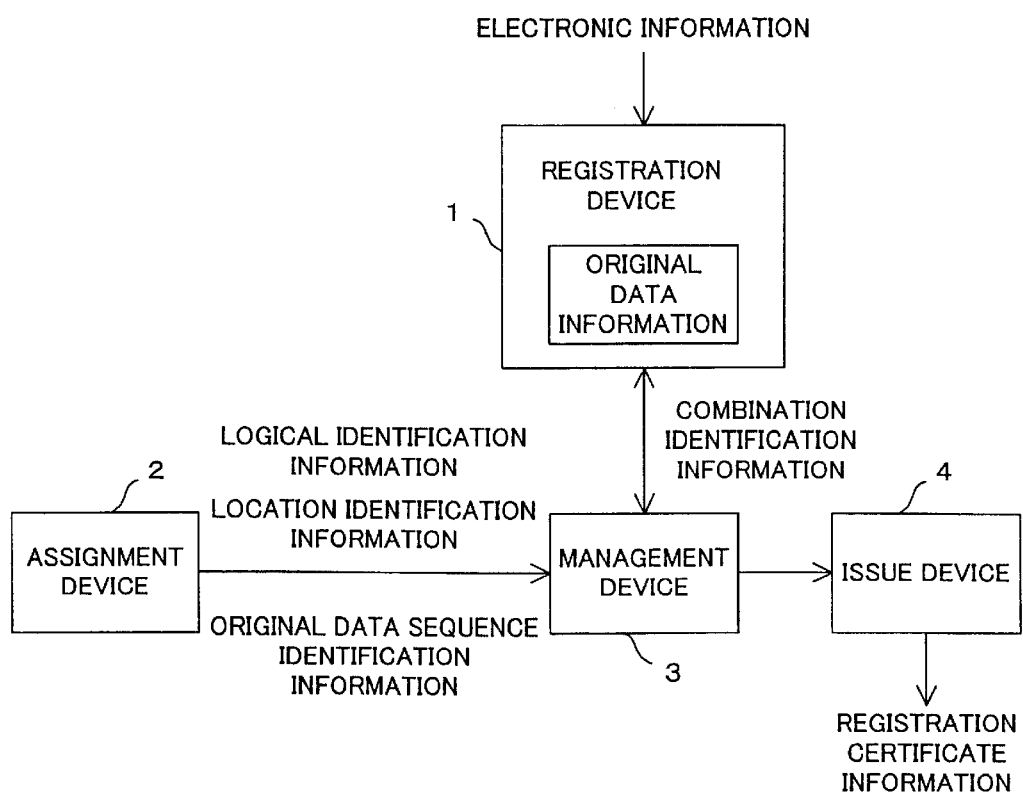
F I G. 1

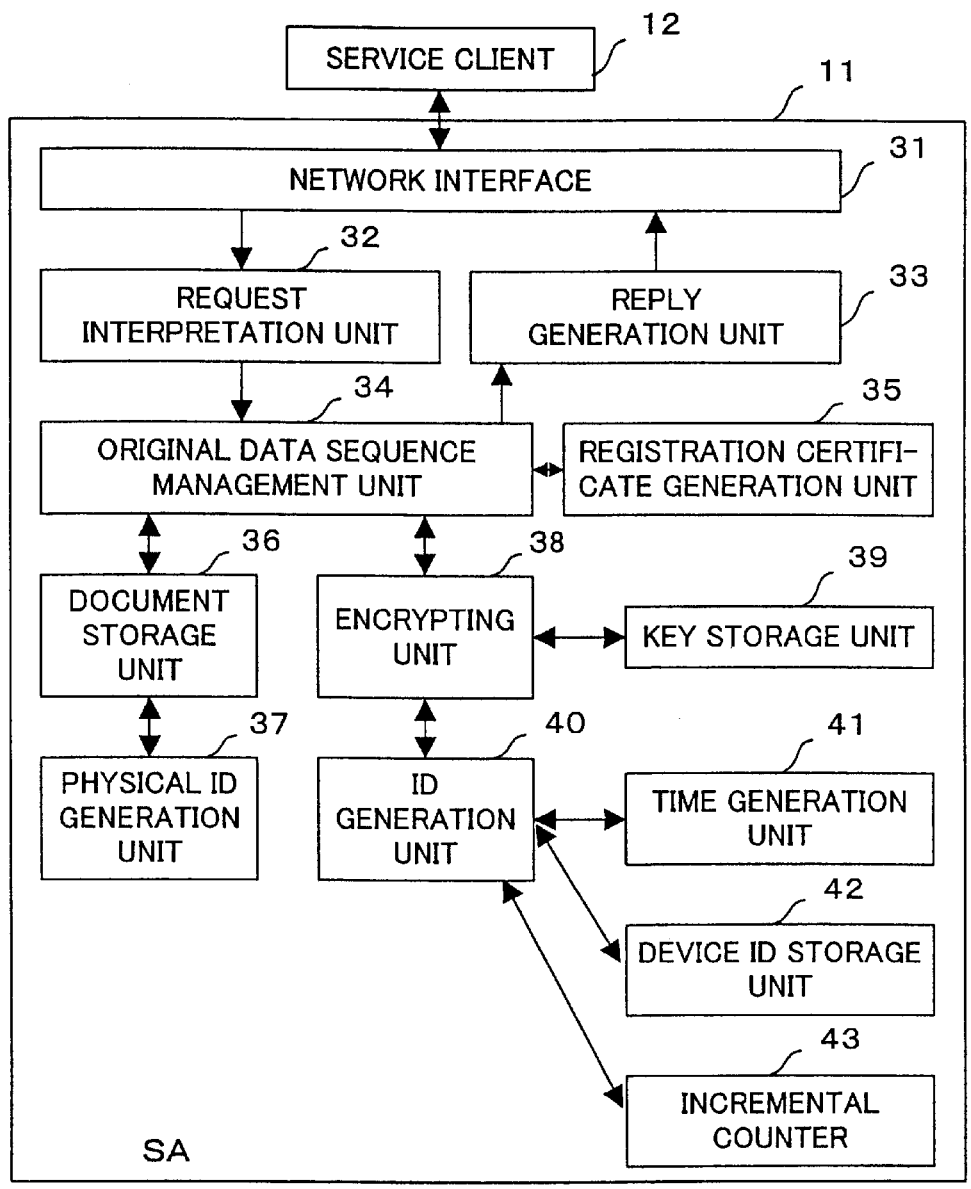
F I G. 4

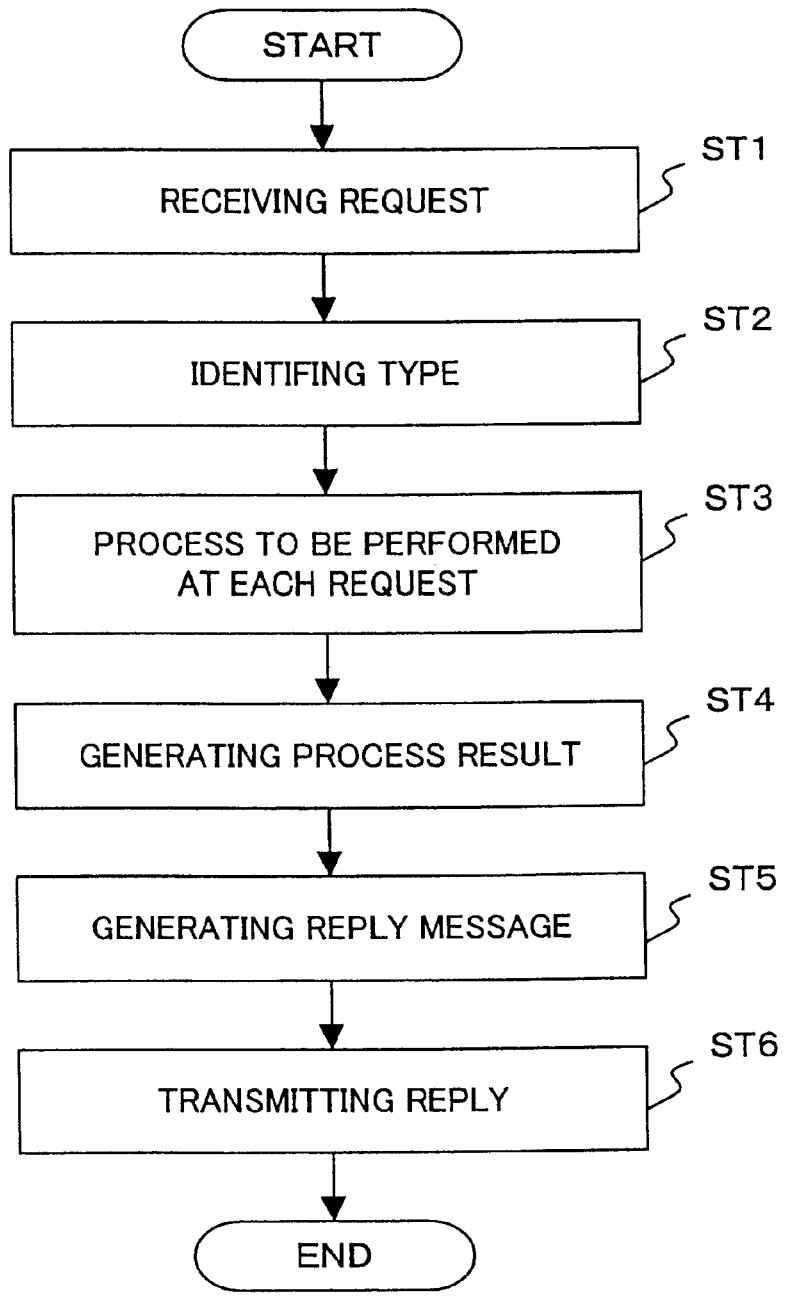
F I G. 5

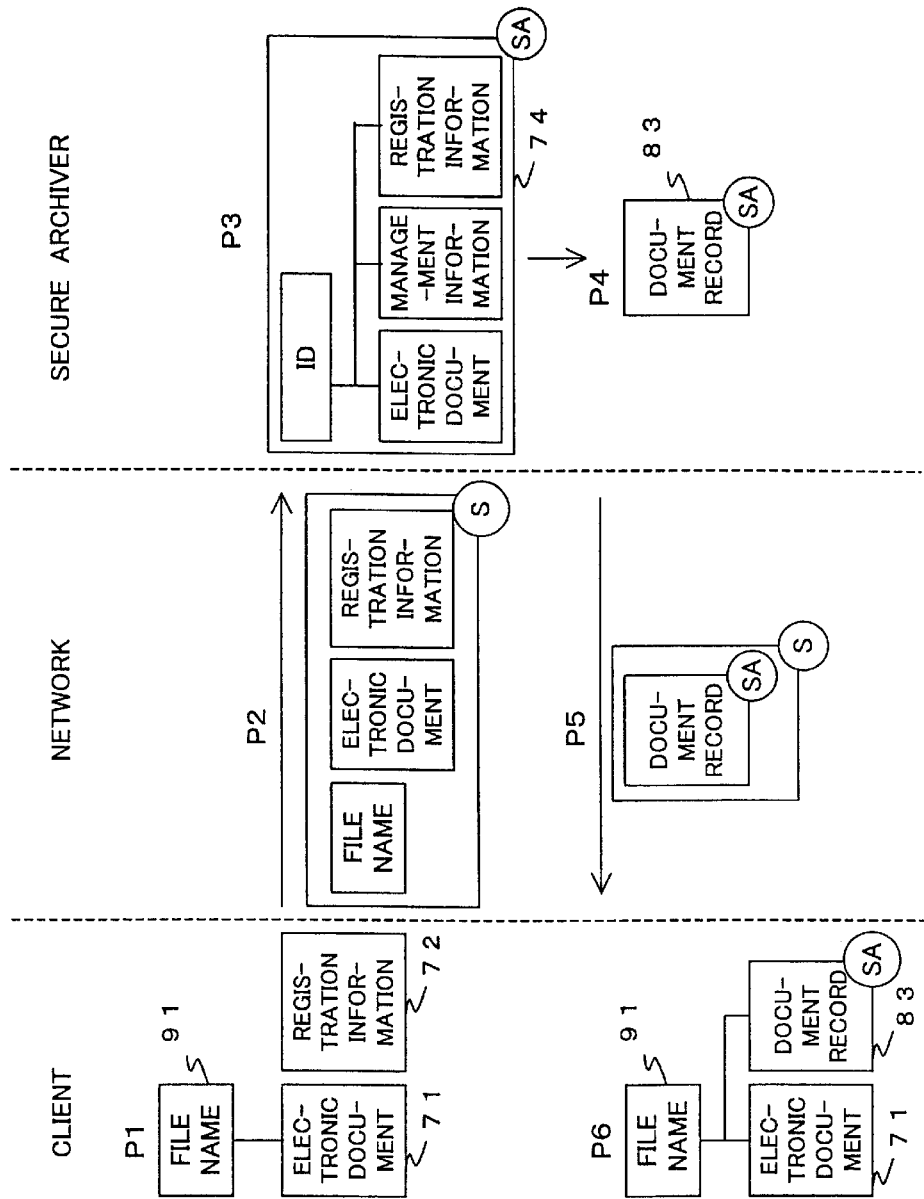
F I G. 17

FIG. 26

| Feb. 17, 1998 : 12:00: | USER A: | REGISTRATION:SA1:ID112233344 |
|---|---|---|
| Feb. 17, 1998 : 14:00: | USER B: | MOVING ORIGINAL DATA:SA1:SA2 |
| Feb. 17, 1998 : 15:00: | USER C: | GENERATING COPY |
| Feb. 17, 1998 : 16:00: | USER D: | MOVING ORIGINAL DATA:SA2:SA3 |

(SA)

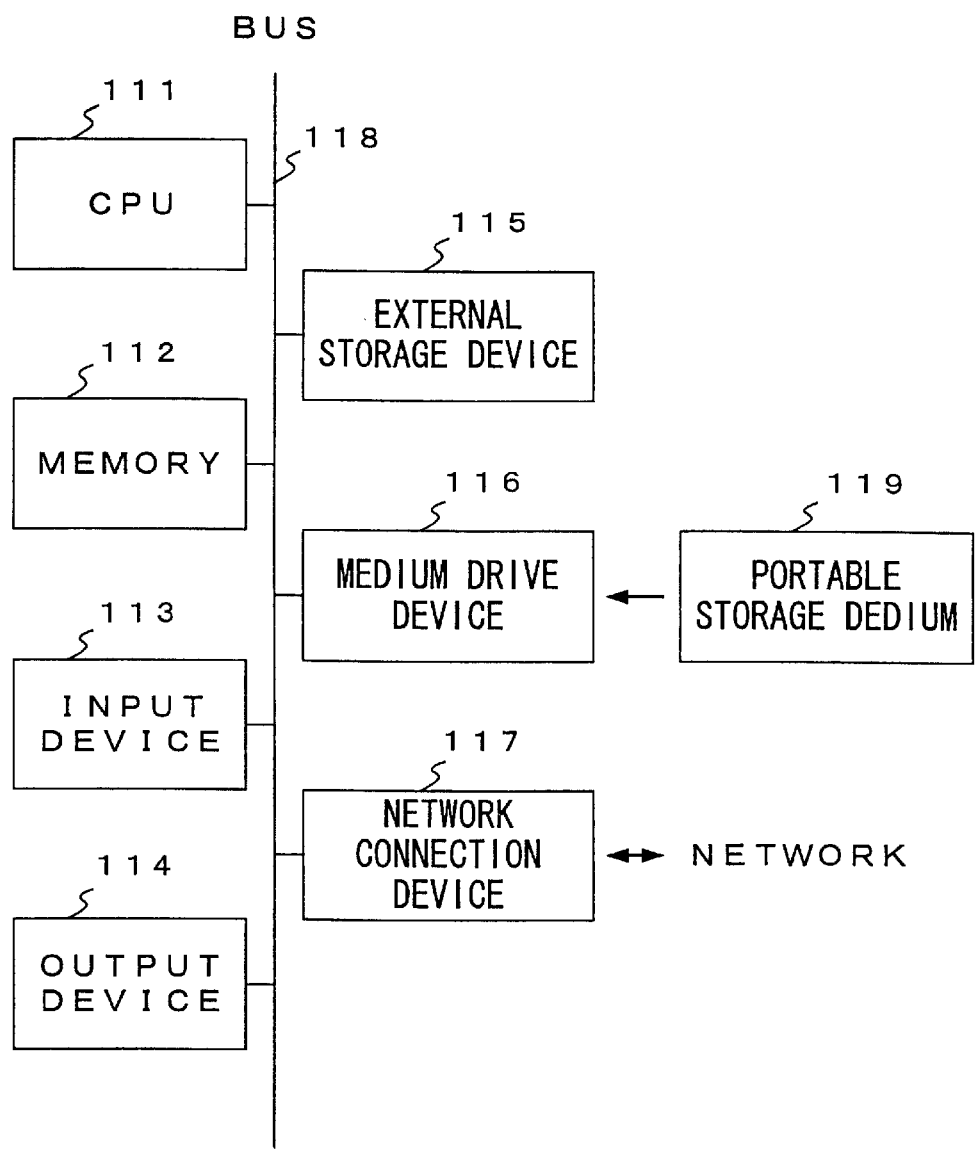
F I G. 27

APPARATUS AND METHOD FOR MANAGING ELECTRONIC ORIGINAL DATA

BACKGROUND OF THE INVENTION

Field of the Invention

The present invention relates to the computerization of documents, and to an apparatus and a method for managing the electronic original data of important documents.

Conventionally, original data of important documents are processed and managed in paper media. The original data has been handled and managed in a file. However, with an increasing number of personal computers and the development of network environment, various electronic services such as inter-company transactions, electronic settlements, etc. have been realized and provided. Thus, important documents processed in paper medium have been stored and processed in electronic media. With the progress of electronic technology, document management applications associated with databases have been developed, and documents have been managed using these applications.

However, there have been the following problems with the conventional document management applications.
1. Since documents are managed in a computer operated by a user, the date of generation of a document, etc. can be easily falsified.
2. Since documents are managed in a computer operated by a user, a document can be easily deleted.
3. Since documents are managed in a computer operated by a user, a document can be easily forged. Although a document management application stores the history of the manipulation of documents, the history can be easily forged.
4. When a document is copied, the same electronic documents can be easily produced, thereby confusing the original document with a copy.

Thus, since electronic documents have the above described problems which are not detected in paper medium, a larger number of restrictions are placed in manipulating electronic documents than in manipulating paper media. Therefore, although documents can be electronically processed, they finally have to be output on paper media when contracting and ordering processes are performed, and have to be managed as legal documents.

SUMMARY OF THE INVENTION

The present invention aims at providing an apparatus and a method for securely managing the electronic original data of an important document.

The electronic original data management apparatus according to the present invention includes a registration device, an assignment device, a management device, and an issue device.

According to the first aspect of the present invention, the registration device registers electronic information as original data information, and the assignment device assigns to the electronic information the logical identification information for identifying the electronic information uniquely in logic and the location identification information indicating the physical location of the electronic information. The management device manages the original data information using the combination identification information based on the combination of the logical identification information and the location identification information, and the issue device issues registration certificate information containing the combination identification information, and is used for access to the original data information.

According to the second aspect of the present invention, the management device generates a series of instances of corresponding original data information depending on a change in a time series of the electronic information, and manages the series of the instances as one original data sequence. The assignment device assigns original data sequence identification information to the original data sequence. The issue device issues registration certificate information which contains the original data sequence identification information, and is used for access to an instance in a series of instances.

BRIEF DESCRIPTION OF THE INVENTION

FIG. 1 shows the principle of the electronic original data management apparatus according to the present invention;

FIG. 4 shows the configuration of a secure archiver;

FIG. 5 is a flowchart of a process performed by a secure archiver;

FIG. 17 shows the registering process;

FIG. 26 shows the state transition information;

FIG. 27 shows the configuration of the information processing device; and

DESCRIPTION OF THE PREFERRED EMBODIMENTS

Figure 2:
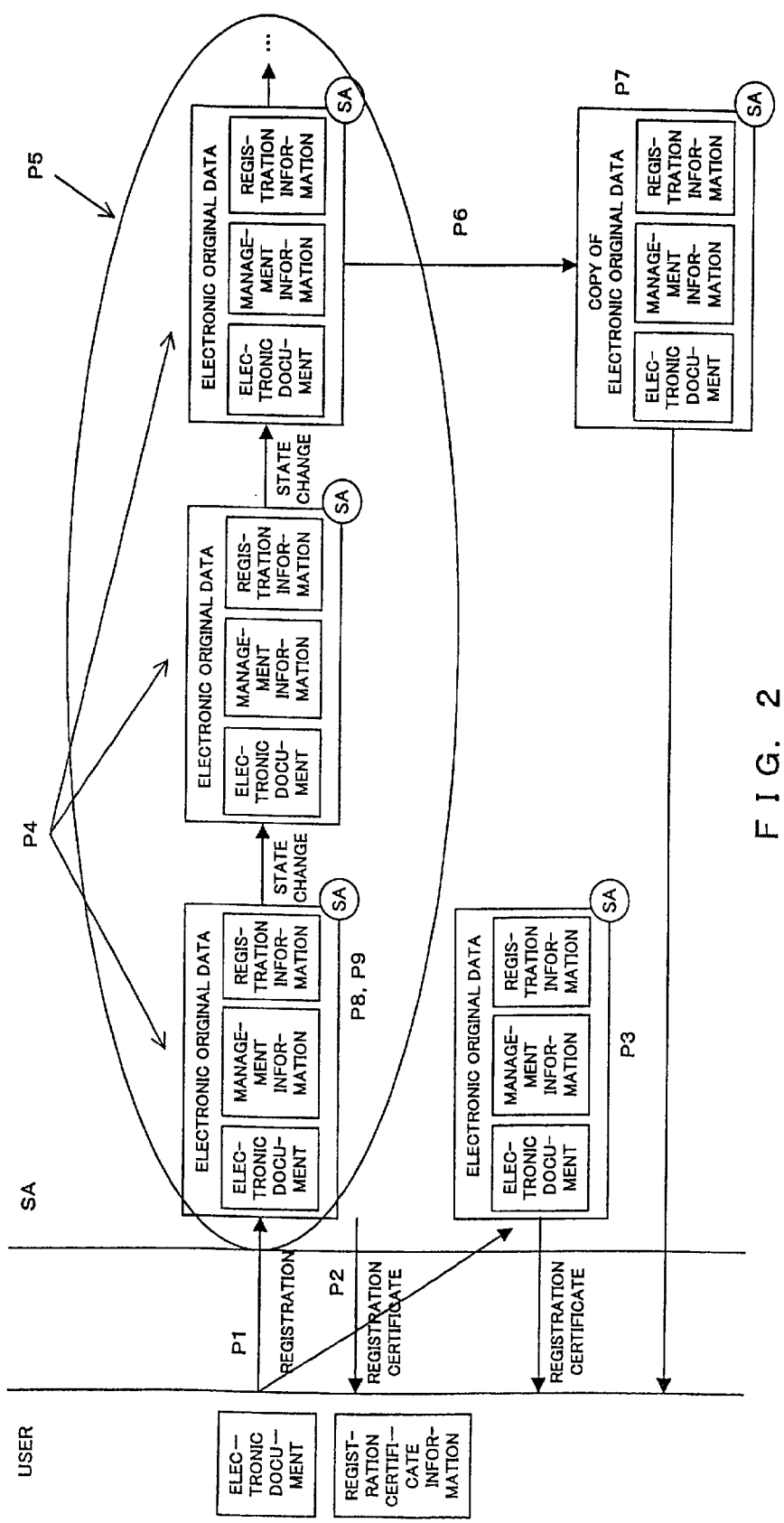
FIG. 2 shows an electronic original data model.

The embodiments of the present invention are described below by referring to the attached drawings.

FIG. 1 shows the principle of the electronic original data management apparatus according to the present invention. The electronic original data management apparatus shown in FIG. 1 comprises a registration device 1, an assignment device 2, a management device 3, and an issue device 4.

According to the first aspect of the present invention, the registration device 1 registers electronic information as original data information, the assignment device 2 assigns the logical identification information identifying the electronic information uniquely in logic, and the logical identification information indicating the physical location of the electronic information. The management device 3 manages the original data information using the combination identification information based on the combination of the logical identification information and the location identification information. The issue device 4 issues registration certificate information which contains the combination identification information, and is used for access to the original data information.

The electronic information registered by the registration device 1 corresponds to, for example, an electronic important document, and the registered electronic information is stored in the registration device 1. The physical location of the electronic information corresponds to, for example, the position (an address, etc.) at which the electronic information is stored in the registration device 1. The management device 3 generates the combination identification information by combining the logical identification information and the location identification information assigned by the assignment device 2, and assigns the combination identification information to the original data information. The issue device 4 generates the registration certificate information containing the combination identification information, and issues the information to the registrant, etc.

The electronic information is registered as original data information. The assignment device 2 assigns the logical identification information identifying the electronic information uniquely in logic, and the logical identification information indicating the physical location of the electronic information. The management device 3 manages the original data information using the combination identification information based on the combination of the logical identification information and the location identification information. The issue device 4 issues registration certificate information which contains the combination identification information, and is used for access to the original data information.

With the above described electronic original data management apparatus, electronic information is not processed as original data information until it is registered. Therefore, it can be declared that a copy of the electronic information generated by the registrant is not the original data information. In addition, since the registrant and other users access the original data information using the issued registration certificate information, the registered original data information can be uniquely identified. Therefore, the security management of the original data can be improved.

Furthermore, according to the second aspect of the present invention, the management device 3 generates a series of instances of corresponding original data information depending on the change in electronic information in a time series, and manages the series of the instances as one original data sequence. The assignment device 2 assigns original data sequence identification information to the original data sequence, and the issue device 4 issues registration certificate information which contains the original data sequence identification information, and is used for access to one instance of a series of instances.

An instance of original data information is generated when registered electronic information is changed by an updating operation, etc., and the management device 3 manages a series of instances using the original data sequence identification information assigned by the assignment device 2. The issue device 4 generates registration certificate information containing the original data sequence identification information, and issues it to the registrant, etc.

With the above described electronic original data management apparatus, a sequence of electronic information generated one after another by an updating operation, etc. can be processed as one group. In addition, since the registrant and other users access each instance according to the issued registration certificate information, the registered original data sequence can be uniquely identified. Therefore, the security of the management of original data can be improved.

For example, the registration device 1 shown in FIG. 1 corresponds to an original data sequence management unit 34 and a document storage unit 36 shown in FIG. 4 and described later. The assignment device 2 shown in FIG. 1 corresponds to a physical ID generation unit 37 and an ID generation unit 40 shown in FIG. 4. The management device 3 shown in FIG. 1 corresponds to the original data sequence management unit 34 shown in FIG. 4. The issue device 4 shown in FIG. 1 corresponds to the original data sequence management unit 34 and a registration certificate generation unit 35 shown in FIG. 35.

According to the present invention, an electronic original data management apparatus is provided in addition to the computer environment for providing services for users. In addition, an electronic document registered in the electronic original data management apparatus is processed as electronic original data regardless of the attribute of original data, a copy, etc., and a registration certificate is issued to the electronic original data. Processing any electronic document as electronic original data corresponds to the state of the electronic document output on paper. Then, the user of the original data accesses the electronic original data by using the registration certificate. For example, electronic original data can be the following items.

1. Securities, health policies, banknotes, etc. The right and the value can be represented, or the original data can be assigned by presenting the original data.
2. Documents generated in commercial activities (legal documents) such as receipts, etc. Original data is generated, and can be presented as evidence in the audit, etc.
3. Documents added to a contract note such as a copy of a family register, registry, etc. A copy of a family register and a copy of a registry certify that the contents of the copies are the same as the contents registered in the family register and the registry. When an agreement is established, they are stored as the original data certifying the identification with the contract note.
4. Contract notes. Two copies of the original data of a contract note are prepared so that each copy can be stored by each party involved in the agreement.
5. Wills, contract notes, etc. Original data is stored by the third party such as a lawyer, a notary's office, etc., and the copies are stored by the parties.
6. Documents generated in general business such as proceedings, plans, etc. The original data of the documents are stored, and are shared among a plurality of parties.
7. Documents generated by government and municipal offices and local autonomy offices. The storage organizations and the publication levels of the documents are set for management.
8. Documents presented as evidence for a patent trial such as study notebooks, design plans, etc.
9. Image information as the evidence of research and development such as photos of DNA (deoxyribonucleic acid)

captured by an electronic microscope, film storing the data of a wind-tunnel test, etc.

FIG. 2 shows a model of electronic original data stored by the electronic original data management apparatus according to an embodiment of the present invention. In FIG. 2, the secure archiver (SA) corresponds to the electronic original data management apparatus, and performs the following processes.

P1: An electronic document processed and generated by a computer on a user side is not recognized as electronic original data until it is registered in an SA. Thus, by recognizing the electronic document as the original data only after registering it in the SA, the electronic document in the SA can be identified as the original data, and the same document obtained by copying the electronic document on the user side is not recognized as the original data.

P2: Then, the SA issues a registration certificate for the registered electronic document (electronic original data). Thus, the electronic original data in the SA can be uniquely identified by the SA issuing a registration certificate and the user accessing the electronic original data in the SA using the registration certificate.

P3: When the same electronic documents on the user side are registered double, the SA defines them as different original data. Thus, by processing the registered electronic documents as different electronic original data, each of the documents which may contain the same contents can be identified as independent electronic original data just as the documents stored on paper media can be processed as physically different documents even if they store the same contents.

P4: When electronic original data is updated, the electronic document at each point is stored as an instance of the original data. In addition, a registration certificate is issued to each instance. Thus, a user can retrieve an instance at a specified point of specified original data using a registration certificate.

P5: A series of instances stored in the process P4 are processed as one piece of original data. Thus, original data which changes in state by an updating process, etc. can be processed as one piece of original data.

P6: Then, only the copy of the electronic original data registered in the SA can be processed as a copy of the electronic original data. Thus, a copied document generated on the user side can be clearly discriminated from the copy of the electronic original data.

P7: Next, a copy generated from the electronic original data is clearly identified as a copy at which point of the electronic original data. A registration certificate is issued to the copy of the electronic original data. Thus, by issuing a registration certificate with the time point of the copy clearly indicated, the user can obtain the copy with the point of the copy of the electronic original data clearly identified.

P8: Then, the registration information such as the attribute, etc. of original data and a copy specified by an application, and the management information independently managed by the SA such as the attribute indicating a copy, original data, etc., the date of generation, etc. are processed together with an electronic document. Thus, by processing an electronic document, management information, and registration information together independent of an application, the attribute of the electronic original data can be referred to at a destination of a document even when the document is moved.

P9: Forgery detection information (the portion represented by the SA enclosed by the circle) is generated as collective information of an electronic document, management information, and registration information. Thus, by generating the forgery detection information containing not only the electronic document, but also the management information and the registration information, the consistency of the electronic document, the management information, and the registration information can be maintained.

Figure 3:
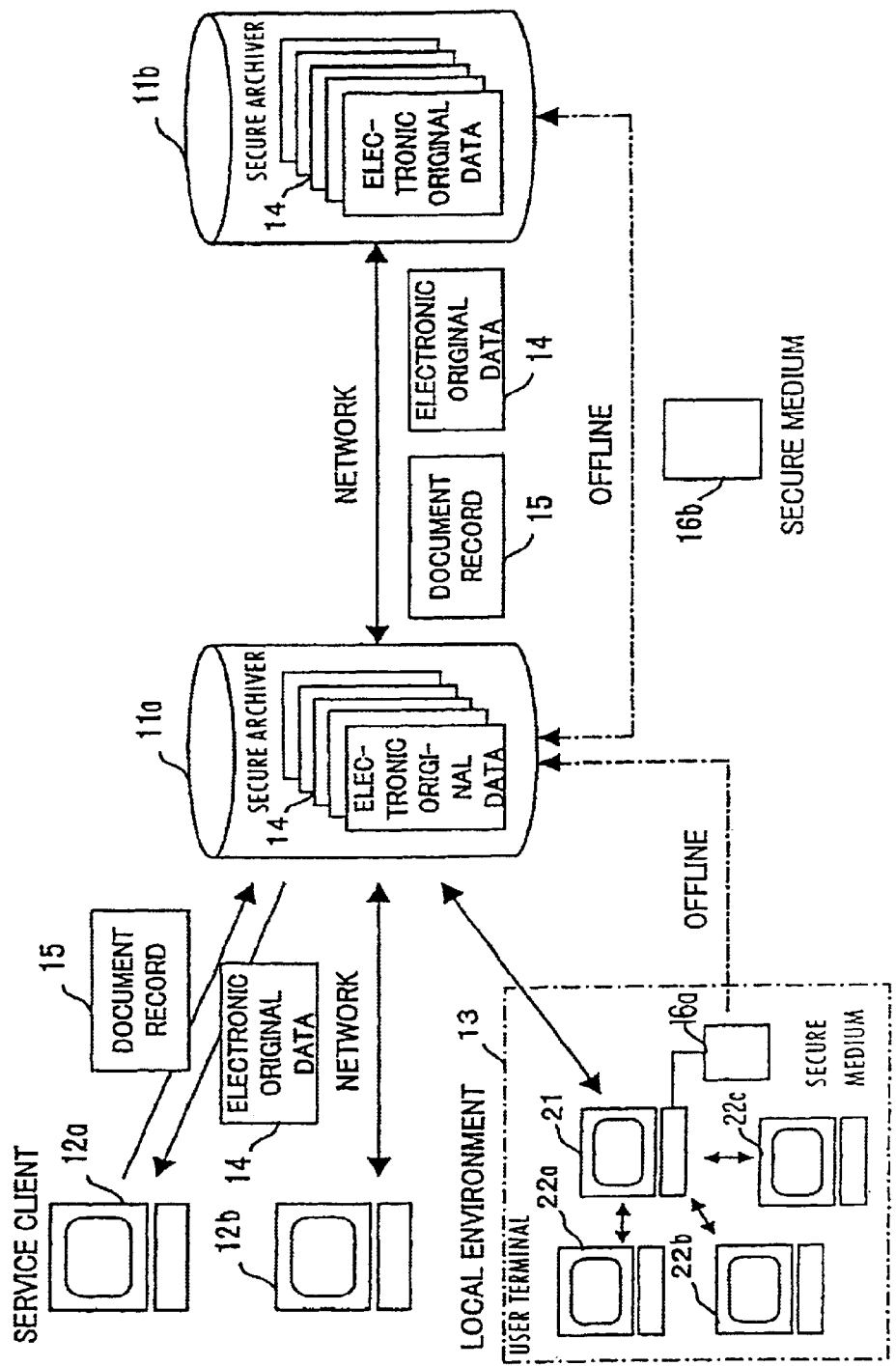
FIG. 3 shows the configuration of the electronic original data management system.

FIG. 3 shows the configuration of the electronic original data management system containing the above described secure archiver. The system shown in FIG. 3 contains an SA 11, a service client (user terminal) 12, and a local environment 13, and electronic original data 14 is transmitted between the service client 12 and the SA 11, and between two SAs 11. A document record 15 correspond to the registration certificate shown in FIG. 2, and us used to access the electronic original data 14 in the SA 11.

The service client 12 and the SA 11 are connected to a communications network. The service client 12 accesses the electronic original data 14 in the SA 11 using the document record 15 issued by the SA 11 when the electronic original data is registered. In transmitting data between the SAs 11, the electronic original data 14 is transmitted using the document record 15 in the network connection as in the communications between the service client 12 and the SA 11. In the offline status, the electronic original data 14 is transmitted using a secure medium 16.

The local environment 13 on the service client side is a system guaranteeing the security (originality) of the uniqueness of the electronic original data in a department of a company, in an office, etc., and contains a local SA 21 and a user terminal 22. The original data managed in the local SA 21 is guaranteed only in the local environment 13, and is not linked with the electronic original data in another SA 11. Between the local SA 21 and an external SA 11, the information about electronic original data can be transmitted through a communications network or the secure medium 16.

FIG. 4 shows the configuration of the SA 11 shown in FIG. 3. The SA 11 shown in FIG. 4 comprises a network interface 31, a request interpretation unit 32, reply generation unit 33, an original data sequence management unit 34, a registration certificate generation unit 35, a document storage unit 36, a physical ID generation unit 37, an encrypting unit 38, a key storage unit 39, an ID generation unit 40, a time generation unit 41, a device ID storage unit 42, and an incremental counter 43.

With the configuration, the document storage unit 36 and the physical ID generation unit 37 form a file system, and the encrypting unit 38, the key storage unit 39, the ID generation unit 40, the time generation unit 41, the device ID storage unit 42, and the incremental counter 43 are installed as security hardware.

FIG. 5 is a flowchart of the process performed by the SA 11. One transaction by the SA 11 is performed by receiving a request from the service client 12, performing a process in a device depending on the request, and transmitting a reply to the service client 12. First, the network interface 31 receives a request from the service client 12 (step ST1), and the request interpretation unit 32 identifies the type of the request (step ST2).

Then, the original data sequence management unit 34 performs a process in response to each request (step ST3), and generates a process result (step ST4). Then, the reply generation unit 33 generates a reply message to the service client 12 (step ST5), and the network interface 31 transmits a reply message to the service client 12 (step ST6), thereby terminating one transaction.

For example, when the request interpretation unit 32 receives a request to register a document from the service client 12, the request interpretation unit 32 interprets that the type of the request is 'registering a document', and transmits the document received from the service client 12 to the original data sequence management unit 34.

Then, the original data sequence management unit 34 requests the ID generation unit 40 through the encrypting unit 38 to generate a logical ID, and stores a document in the document storage unit 36. The ID generation unit 40 obtains a time stamp from the time generation unit 41, obtains the device ID of the SA 11 from the device ID storage unit 42, obtains a counter value indicating the document ID in the device from the incremental counter 43, and generates a logical ID.

In addition, the encrypting unit 38 puts a digital signature on the logical ID using the device key (unique key of the SA) stored in the key storage unit 39, and transmits the logical ID to the original data sequence management unit 34. In addition, the physical ID generation unit 37 generates a physical ID indicating the physical location of the document, and transmits it to the original data sequence management unit 34 through the document storage unit 36.

The original data sequence management unit 34 links the logical ID to the physical ID, and transmits them to the encrypting unit 38. The encrypting unit 38 puts a signature using a device key stored in the key storage unit 39, and returns the generated digital data as an ID to the original data sequence management unit 34. The original data sequence management unit 34 manages the received ID as the identification information about the document to be registered, Then, the original data sequence management unit 34 instructs the registration certificate generation unit 35 to generate a document record, and the registration certificate generation unit 35 generates a document record and returns it to the original data sequence management unit 34. The original data sequence management unit 34 transmits the document record to the reply generation unit 33, and the reply generation unit 33 generates a reply message to the service client 12, and transmits the message to the service client 12 through the network interface 31, thereby terminating the process. The same process is performed with the configuration of the local SA 21 shown in FIG. 3.

Then the process performed by the system shown in FIG. 3 is described below in detail by referring to FIGS. 6 through 26.

As described above, the SA issues a document record as a registration certificate to a user when electronic original data is registered. The user accesses the electronic original data in the SA using the document record, and transmits the document record to another user sharing the original data. The user sharing the original data can use the original data by accessing the SA using the received document record. The requirements of a document record are listed as follows.
1. To prove the fact of the registration of electronic original data.
2. To provide the information about for which original data in the SA the document record has been issued.
3. To provide the information about which electronic document of the user has been registered as original data.
4. To provide the information about the registrant (owner) of the original data.
5. To provide the information about the SA to be accessed.
6. To detect the forgery of the document record.

Figure 6:
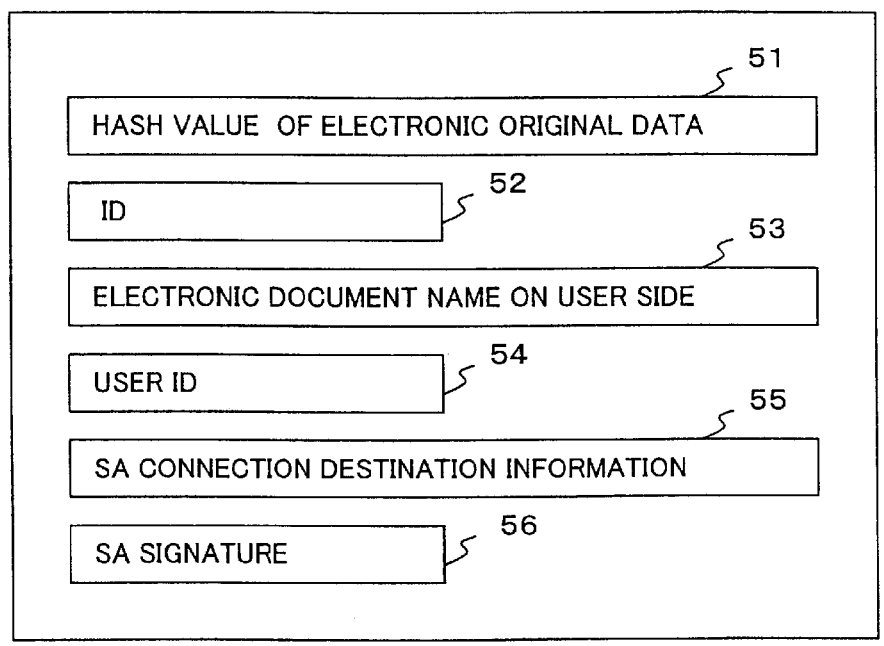
FIG. 6 shows a document record.

Based on these requirements, the SA embeds the information as shown in FIG. 6 into the document record, and issues it. A hash value 51 is obtained by compressing the contents of the original data registered in the SA. When the hash value 51 is compared with the hash value of the electronic document of the user, it is confirmed that the electronic document has certainly be registered in the SA. Therefore, the hash value 51 is used as the information certifying the fact of the registration. Instead of the hash value 51, a result of converting the contents of the original data using one of other one-directional functions can be used.

An ID 52 is identification information for uniquely identifying the electronic original data in the SA, and is generated from a logical ID and a physical ID. The SA adds the ID to the document record as the information indicating for which electronic original data the document record has been issued.

An electronic document name 53 on the user side corresponds to the name of a file managed on the user side, and is added as the information associating the electronic original data in the SA with the electronic document of the user. A user ID 54 is the identification information for use in an authenticating process performed when original data is registered, and is added to a document record as the information about a registrant (owner) of the original data.

SA connection destination information 55 corresponds to the IP (Internet protocol) address of the SA, the FQDN (fully qualified domain name), etc. and is added to a document record as the identification information about the SA to be accessed. An SA signature 56 is signature information to be computed and added by the SA to the information about a document record when the document record is issued, and is also the information certifying that the SA has issued the document record. A user transmits a document record on which the SA signature 56 has been put, and can verify the existence of forgery of the electronic document.

Described below is the management of an original data sequence. Original data registered by the SA changes in state by an updating process, a moving process, a deleting process, etc. The SA stores the instance of the original data at the point each time the state of the original data changes, and manages a series of instances as an original data sequence. Then, the SA assigns an original data sequence ID to the original data sequence to uniquely identify it. Thus, a service client can specify and extract the sequence as a piece of original data.

Figure 7:
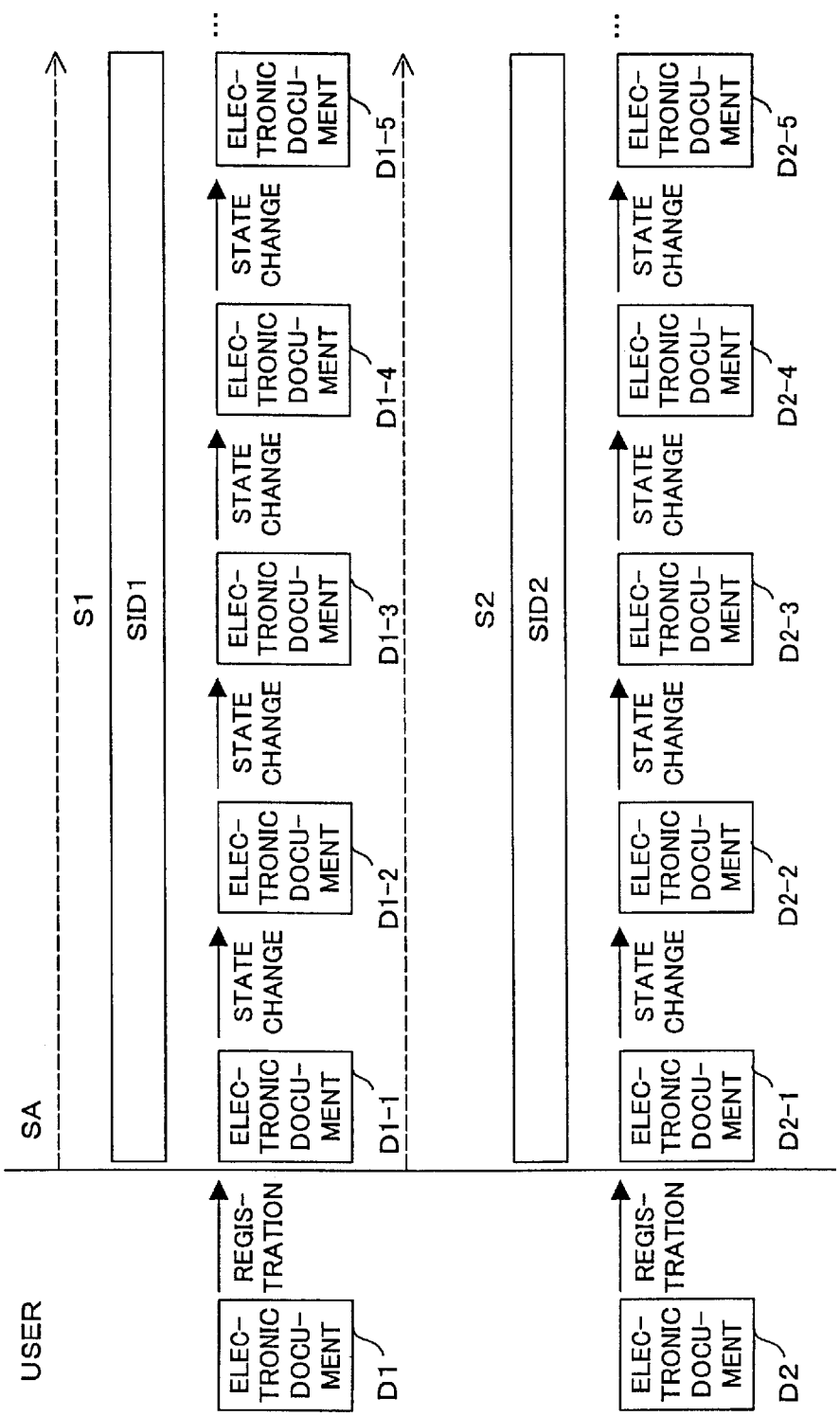
FIG. 7 shows the management of an original data sequence.

FIG. 7 shows an operation of uniquely identifying an original data sequence by an original data sequence ID. When an electronic document D1 is registered as an electronic document D1-1 in the SA, the SA assigns an SID1 as an original data sequence ID to the electronic document D1-1, and manages it as an original data sequence S1.

If the electronic document D1 is amended, the state of the original data is changed, and a registering process is performed again, then the SA generates and stores an instance of an electronic document D1-2 having the SID1 as an original data sequence ID. Afterwards, each time a change occurs, an instance such as an electronic document D1-3, D1-4, D1-5, etc. is stored, and a series of instances are identified by the SID1.

An SID2 is assigned as a new original data sequence ID to an electronic document D2 registered separate from the electronic document D1. Then, a series of instances D2-1, D2-2, D2-3, D2-4, D2-5, etc. are identified by the SID2, and managed as an original data sequence S2. At this time, even if the contents of the electronic document D2 are the same as the contents of the electronic document D1, the SA manages each of the documents as a different piece of electronic original data.

Using such an original data sequence ID, a series of instances generated when a state change arises can be identified as a piece of original data. However, when a legal document is audited, etc., it is necessary to specify and extract an instance at an optional point in an original data sequence. Therefore, the SA assigns a time stamp to an instance at each point of the original data sequence.

Figure 8:
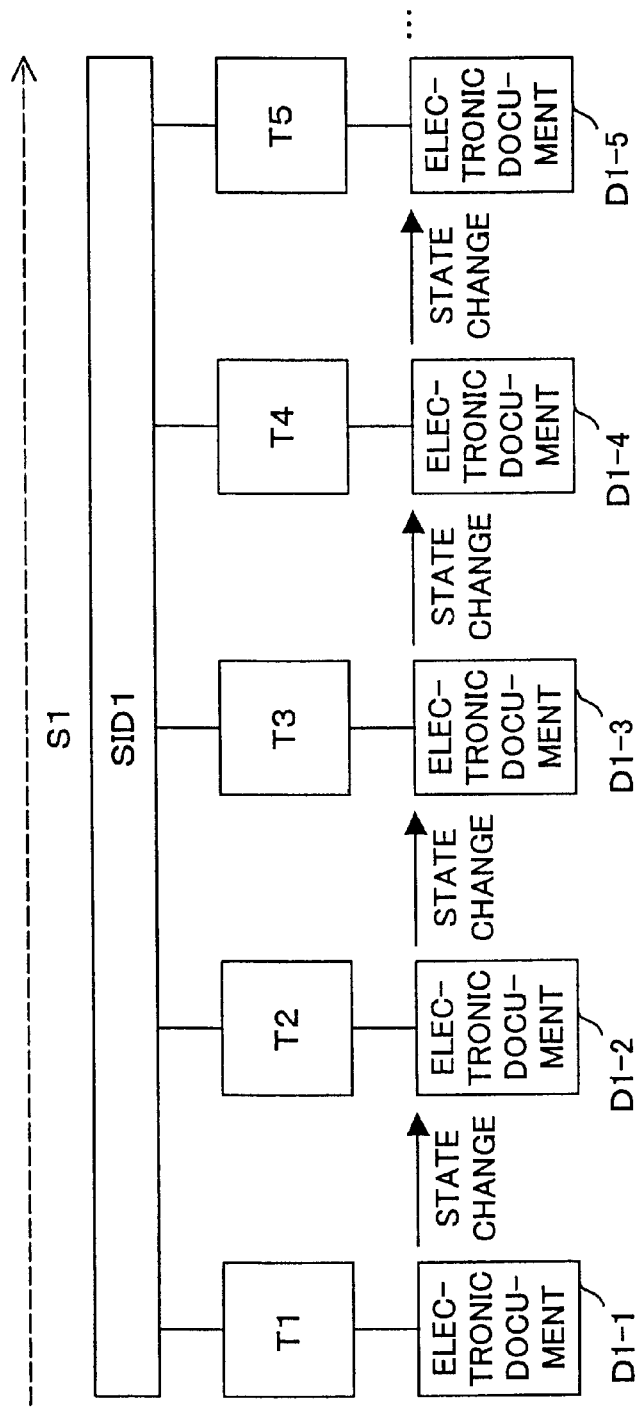
FIG. 8 shows the time-series management.

FIG. 8 shows an operation of managing by a time stamp an instance changing in a time series. When the electronic document D1 is registered as the electronic document D1-1, a time stamp T1 put when the registering process is performed is assigned. Afterwards, each time a state changes, time stamps T2, T3, T4, T5, etc. are assigned to each instance. The user specifies and extracts the original data sequence ID and a time stamp to designate the instance at an optional point of the electronic original data.

Then, to clarify the requirements of the management of electronic original data and its copy, the problems with a copy of an electronic document are first described. when an electronic document is copied, an electronic document having the same Contents as the original document can be generated. Therefore, any number of copies of the original document can be generated, and the original data cannot be identified. Therefore, copies have been managed using a label put on each medium.

In addition, even when an electronic document has been illegally copied, it is not possible for an owner of the original document to be informed that the document has been copied, and a user who has made a copy can process the copy as an original electronic document. In the case of a paper medium, an original document can be distinguished from its copy by the quality of the paper.

In the case of a paper medium, when a plurality of copies are made, each copy can be physically identified. However, in the case of an electronic document, a copy can have the same contents as the original document. Therefore, each copy cannot be identified, and cannot be distinguished from the original document.

Considering the above described problems, there are the following requirements in managing electronic original data and its copies.
1. A device for uniquely identifying electronic original data and its copy is to be provided for a user. The user is given information identifying an original document and a copy so that the copy can be identified as a copy of which electronic original data.
2. Each of a number of copies should be uniquely identified.

To satisfy these requirements, the SA manages an original document and its copy as follows.

1. Uniquely Identifying an Original and a Copy of Electronic Original Data using a Document Record An electronic document is registered in the SA and managed such that an electronic document in the SA specified by a document record issued when the document can be registered as original data, and a copy of the original data can be generated only from the electronic original data. In addition, a document record is issued when a copy is made, and only the electronic document in the SA specified by the document record is processed as a copy of original data.

By managing an electronic document specified by a document record as the electronic original data or its copy, a document record can uniquely identify the original data in the SA even when a user makes a copy of the document record. Accordingly, the problem that original data cannot be identified or there are a number of copies generated, etc. can be successfully solved.

2. Management by a Type Attribute

An attribute identifying an original document or a copy (a type attribute) is assigned to the electronic original data registered in the SA. When a copy is made from the original data, an electronic document inheriting an original data sequence ID and a time stamp is generated, 'copy' is assigned to the copy as a type attribute, thereby defining the electronic document as a copy of the original data. Thus, the generated copy of the electronic original data clearly indicates the instance of the electronic original data from which it has been generated. A type attribute is added to the document record, and provided for the user, and the user refers to the document record to identify the original and the copy of the electronic original data.

Furthermore, a type attribute containing a serial number indicating the ordinal number of a copy is assigned to a copy of the electronic original data so that each of a plurality of copies can be identified as an independent document. Thus, a plurality of copies can be managed by the type attribute containing a serial number.

Figure 9:
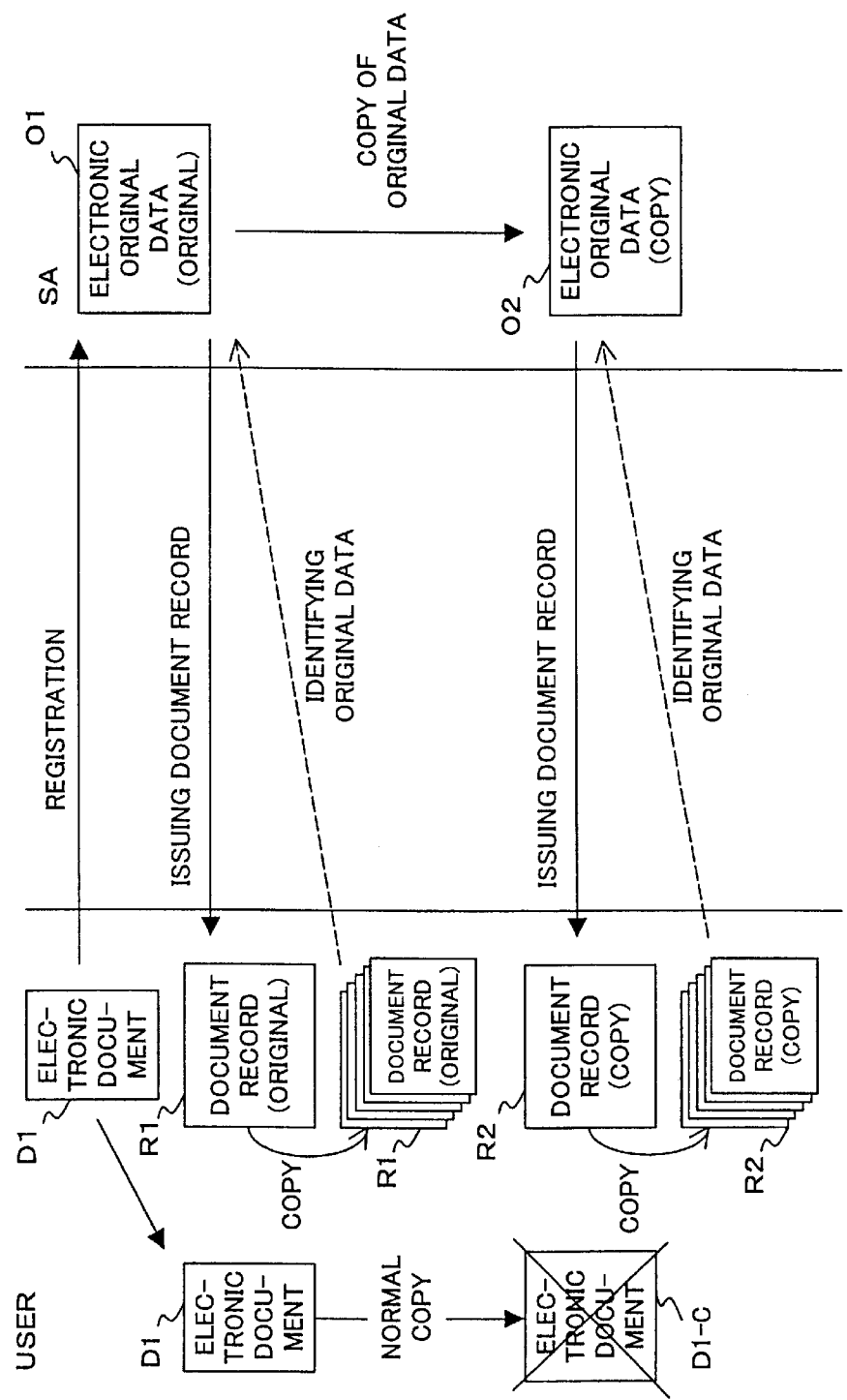
FIG. 9 shows the identification between original data and a copy.

FIG. 9 shows an operation of uniquely identifying electronic original data and its copy using a document record. When the electronic document D1 is registered in the SA as electronic original data, it is stored as electronic original data O1 (original) in the SA. A document record R1 (original) is issued for the electronic original data.

The document record R1 uniquely identifies the electronic original data O1 in the SA. Although the document record R1 is copied by a personal computer, etc. of a user, the copy of the document record R1 uniquely refers to the electronic original data O1 in the SA. As a result, there is not the problem that the original data cannot be correctly identified.

When electronic original data O2, which is a copy of the original data, is made from the electronic original data O1, a document record R2 is issued for the electronic original data O2 as it is issued to the electronic original data O1. Although the document record R2 is copied, a copy of the document record R2 can uniquely identify the electronic original data O2 in the SA.

A copy of the electronic document D1 on the user side is made in a normal copying operation, and the copied electronic document D1-C has no effects as original data because the user system can only manage the electronic document in the SA uniquely specified by the document record R1 as original data.

In the above described management of the electronic original data and its copy, the user system can extract the latest state of the original data in the SA and an instance effective as the original data using a document record even if the electronic original data has been illegally updated in the SA. Therefore, the electronic original data and its copy can be secured as being uniquely identified.

Figure 10:
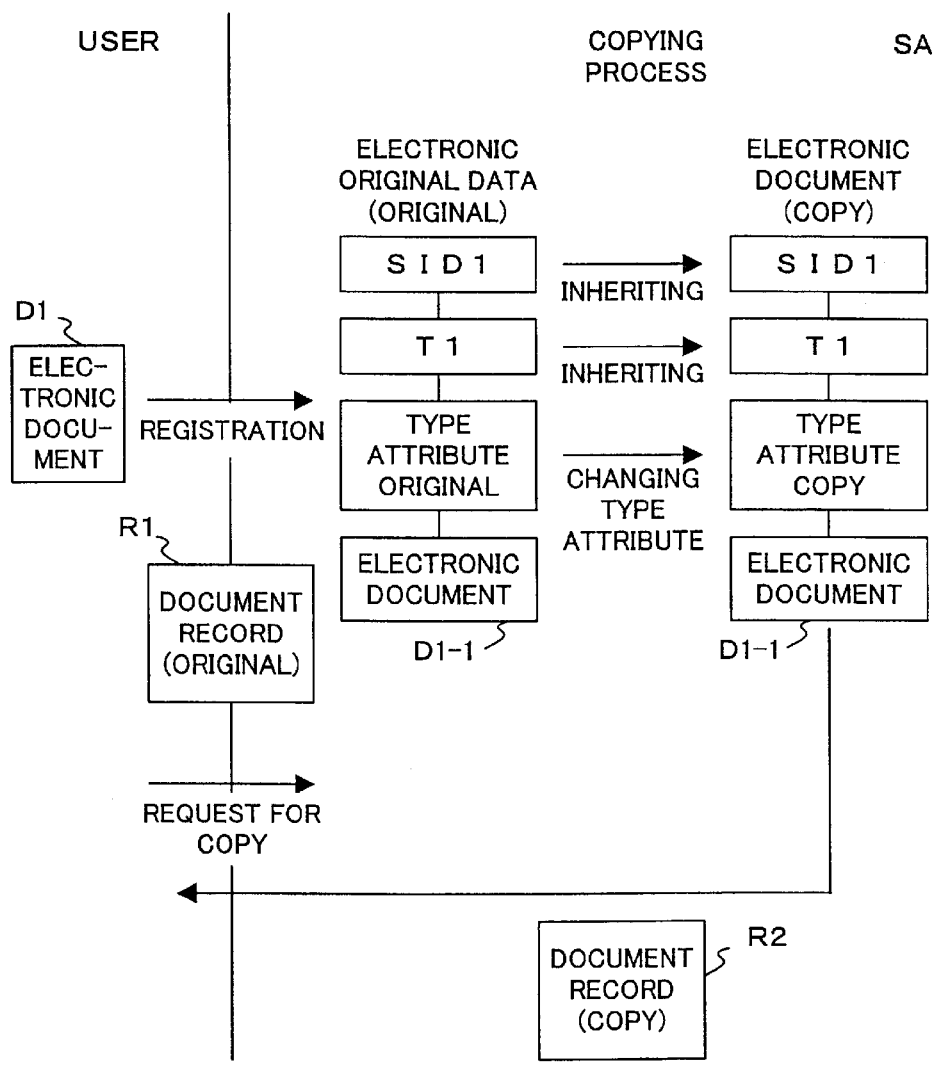
FIG. 10 shows the management using a type attribute.

FIG. 10 shows an operation of assigning a type attribute to an electronic document. When the electronic document D1 is registered as original data in the SA, 'SID1' is assigned as an original data sequence ID, 'T1' is assigned as a time stamp, 'original' is assigned as a type attribute, and the electronic document is registered as original data ('original'). 'Original' is set as the initial value of the type attribute in all electronic documents registered by the user in the SA. When the electronic documents are registered, the SA issues the document record R1 (original) of the electronic original data to the user.

When the user requests the SA to make a copy of the electronic document, the SA inherits the original data sequence ID of the electronic original data and the time stamp, and newly generates electronic original data (copy) with the type attribute changed to 'copy'. It is necessary to inherit an original data sequence ID and a time stamp in order to clearly describe the time point at which the instance has been copied. The SA issues the document record R2 (copy) to the user as in the case of the electronic original data (original).

Figure 11:
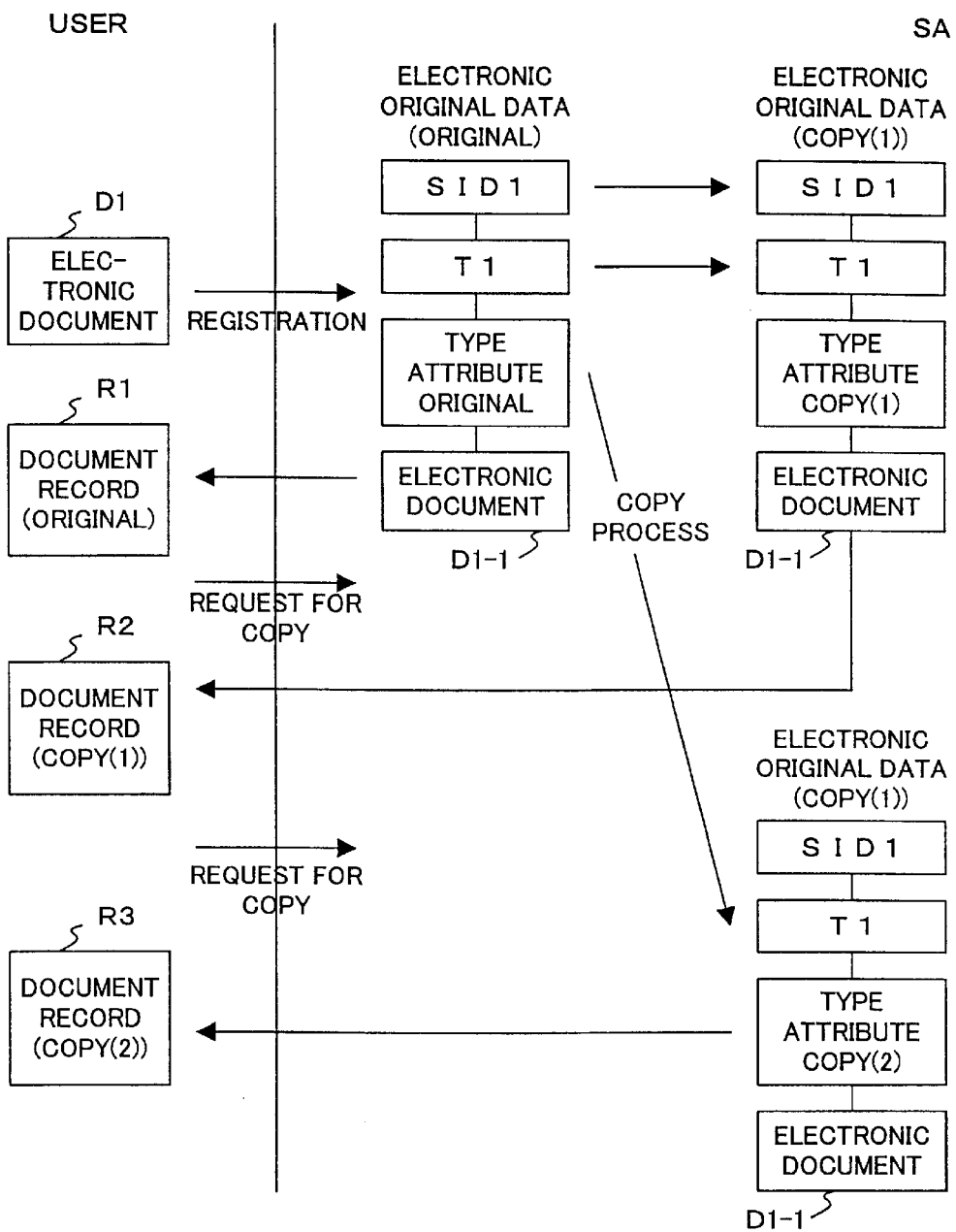
FIG. 11 shows the management of a plurality of copies.

FIG. 11 shows the operation of independently managing each of the plural copies of the original data using a serial number assigned to a type attribute, and the operation of a user uniquely identifying each copy. When the user requests to make a copy of the electronic original data (original), the SA performs a process similar to the process shown in FIG. 9, and generates electronic original data (copy (1)). At this time, a serial number (1) is assigned to the copy of the type attribute.

When the user requests to make a copy of the electronic original data again, electronic original data (copy (2)) is generated, and a serial number (2) is assigned to the copy of the type attribute. The document records R2 and R3 are issued to the copies (1) and (2) of the electronic original data of the user. Thus, by assigning a serial number to the copy of a type attribute, a copy of each electronic original data can be independently managed in the SA. In addition, the user can uniquely identify a copy of each piece of electronic original data using a document record.

Described below is the management of the physical location of a document. Since a paper medium can be moved from its original position to another position, the physical position of the original data can be recognized. However, although the location of the original data is managed using an original data management book, etc., the position (location) of the original data cannot be guaranteed. There are the following problems with an electronic document as well as a document on a paper medium.

1. The location of an electronic document cannot be uniquely specified.
2. Since a document can be easily copied or moved, an illegal copy or use cannot be detected.

Then, the SA performs the following processes on electronic original data to guarantee the location of the electronic original data.

1. Information (physical ID) specifying the physical location of electronic original data is assigned to the electronic original data to be registered in the SA, thereby uniquely specifying the location.
2. An illegal copy is detected using a physical ID.

In the environment where a network and an online system coexist, it is predicted that a plurality of SAs manage electronic original data. Then, a physical ID is formed by an SA-ID specifying an SA, and an address ID indicating in which medium and at which position the electronic original data is stored in the SA. The address ID can be a physical address on a medium.

Figure 12:
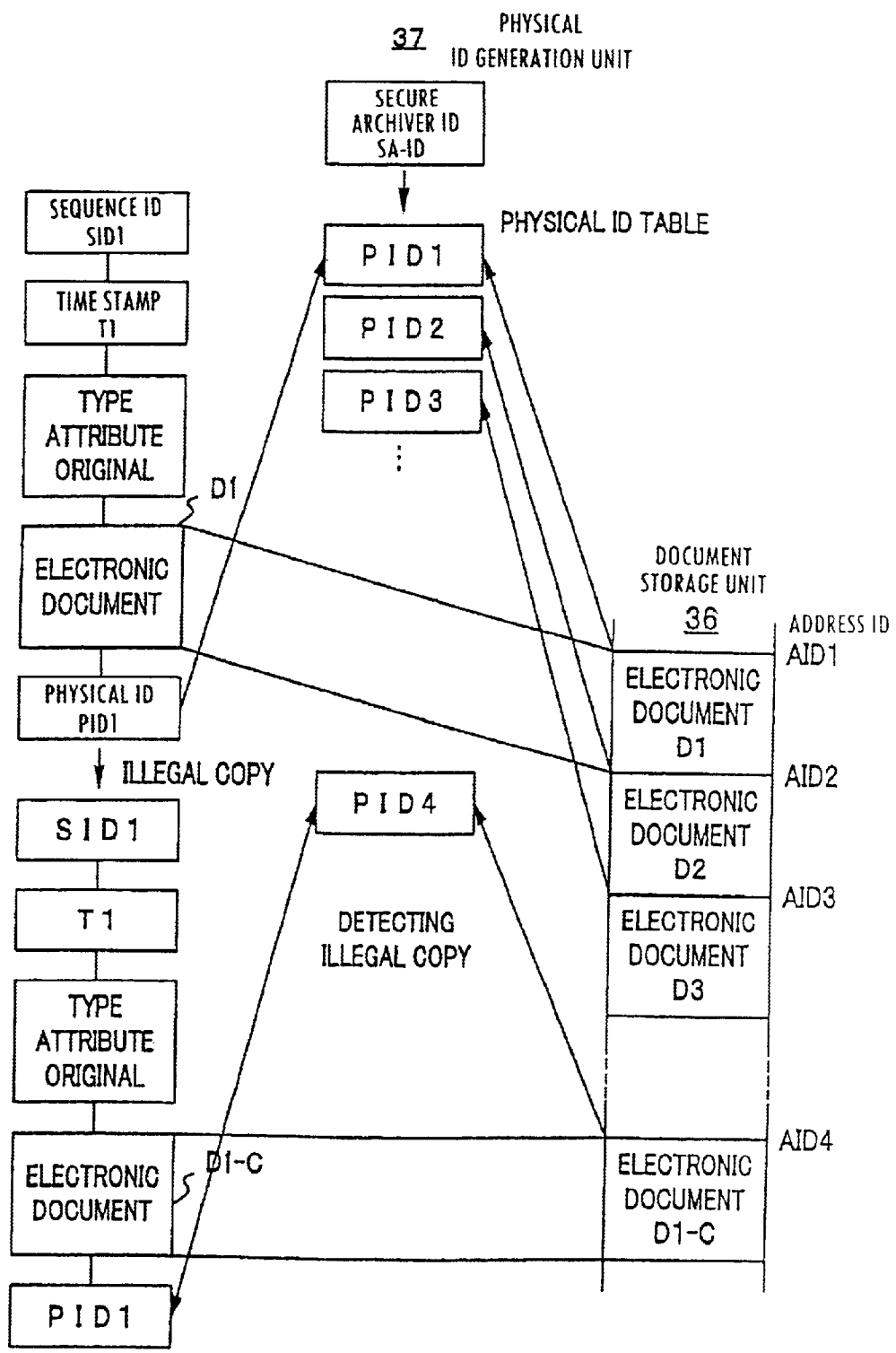
FIG. 12 shows the detection of illegal copies.

FIG. 12 shows that a physical ID specifies the location of electronic original data, and is used to detect an illegal copy. A PID1, which is a physical ID of the electronic document D1, is formed by an SA-ID and an address ID (AID1) of the document storage unit 36. The physical ID is added to the electronic document D1. The electronic document D2 and an electronic document D3 are electronic original data normally managed respectively using the AID2 and the AID3 as address IDs.

A table of physical IDs is stored by the physical ID generation unit 37 shown in FIG. 4, and stores the correspondence between each electronic document and the physical ID generated from its address ID. The physical IDs of the electronic documents D1, D2, and D3 are respectively PID1, PID2, and PID3.

When an administrator, etc. illegally copies the electronic document D1, the electronic document D1-C which is a copy is stored in the place having the AID4 as an address ID. In this case, the physical ID of the electronic document D1-C is the PID1, and the physical ID registered in the table of physical IDs is the PID4 formed by the SA-ID and the AID4. Therefore, when the physical IDs are compared with each other, it is apparent that they are different from each other, thereby detecting the illegal copy. When a document is illegally copied to another SA, the illegal copy can be similarly detected from different SA-IDs.

Figure 13:
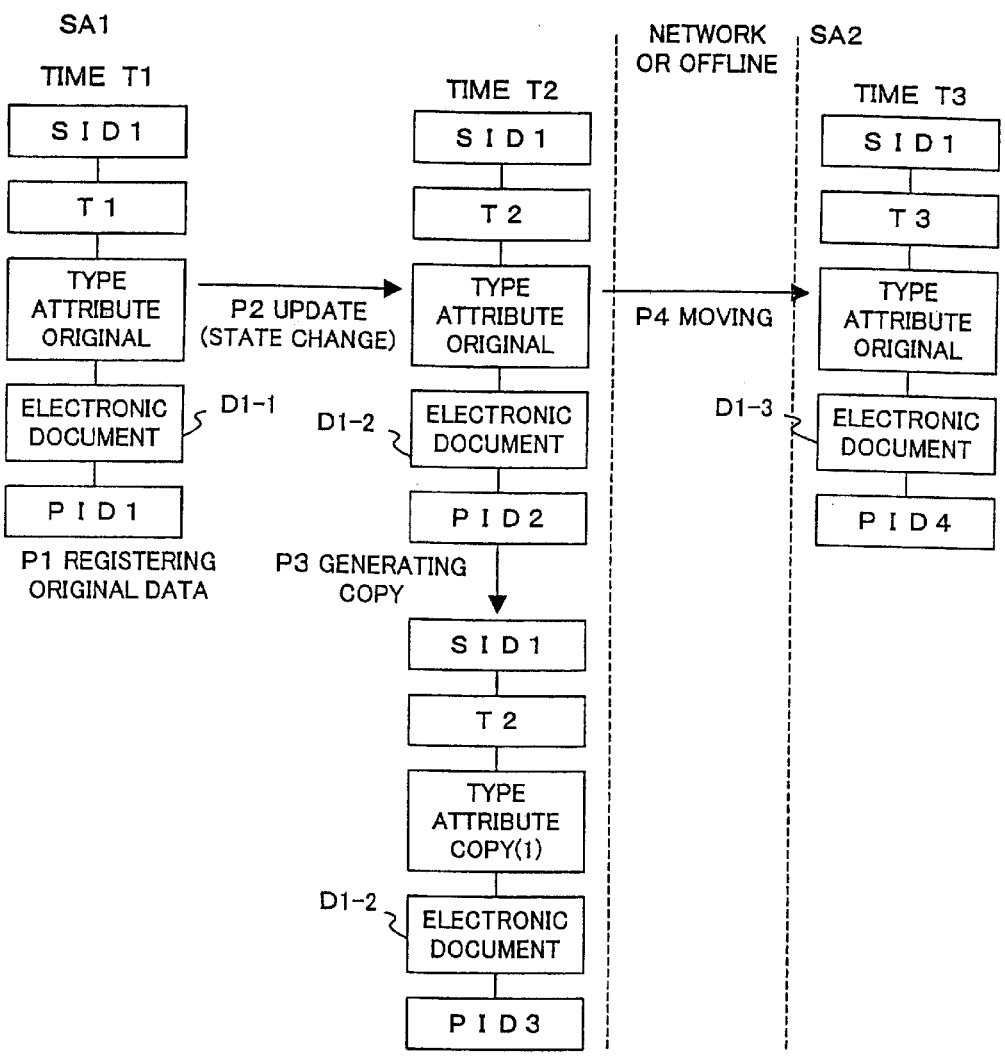
FIG. 13 shows a change in identification information.

FIG. 13 shows an example of a change in each type of identification information in an original data sequence. In FIG. 13, identification information is changed in the following procedure.

P1: Registration

At a time T1, a user registers the electronic document D1-1 in the SA1. The SA1 first assigns the SID1 as an original data sequence ID in the registering process. Using the original data sequence ID, a sequence in which the state of the original data changes can be uniquely identified. Second, T1 is assigned as a time stamp. Using the time stamp, an instance at each point in the original data sequence can be uniquely identified. Third, 'original' is set as a type attribute. The type attribute of an electronic document registered in the SA is 'original'.

Then, the SA1 identifies original data at each point uniquely in logic according to the above described identification information, that is, an original data sequence ID, a time stamp, and a type attribute. Fourth, in addition, a PID1 is assigned as a physical ID. The physical ID clarifies the location of an electronic document, detects an illegal copy, etc.

P2: Update (state change)

At a time T2, a user updates the electronic document D1-1, and generates an electronic document D1-2. Thus, the state of the original data changes. At this time, electronic original data assigned the T2 and the PID2 respectively as a new time stamp and a new physical ID is generated without changing the original data sequence ID and the type attribute.

P3: Generating a copy

A user generates a copy of the electronic document D1-2. At this time, electronic original data assigned 'copy (1)' and the PID3 respectively as a new type attribute and a new physical ID is generated without changing the original data sequence ID and the time stamp. The time stamp is not changed so that the electronic original data can be clearly identified as a copy made at a time point of the original data sequence. The time at which the copy has been made is stored as the management information about a history, etc. In addition, a copy attribute is assigned a serial number, thereby managing an instance of each copy.

P4: Moving a document

At a time T3, a user moves the electronic document D1-2 from the SA1 to the SA2. At this time, electronic original data assigned the T3 and the PID4 respectively as a new time stamp and a new physical ID is generated without changing the original data sequence ID and the type attribute. Since the physical ID contains an ID uniquely identifying the SA, an illegal moving of an electronic document can be detected using the physical ID.

Figure 14:
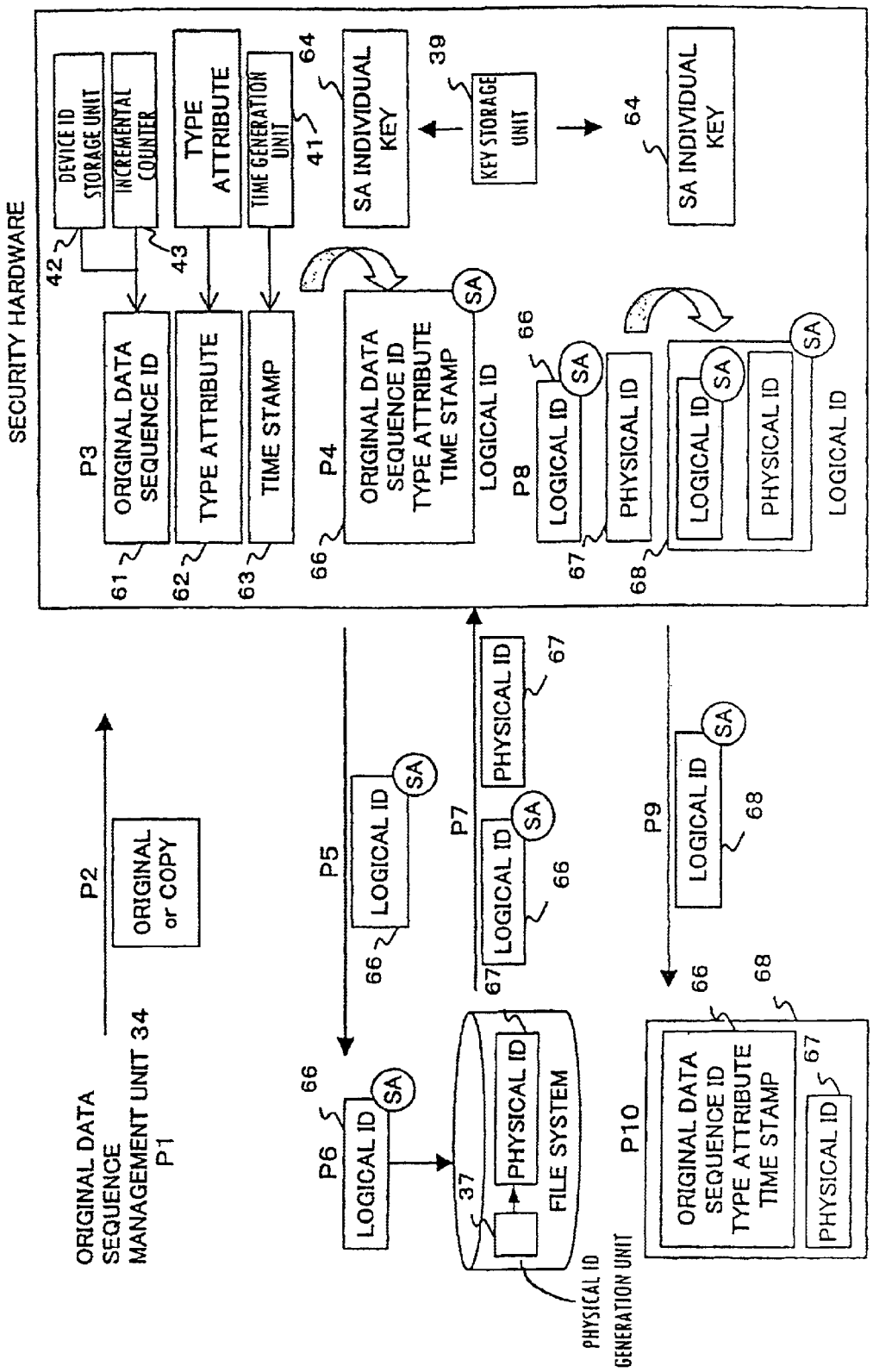
FIG. 14 shows the generation of an ID.

The process performed in the SA is described below further in detail. FIG. 14 shows the operation of generating an ID. The process is performed in the following procedure.

P1: Request to generate a logical ID

Upon receipt of a request to register an electronic document, the original data sequence management unit 34 requests the security hardware to generate a logical ID.

P2: Request

When the original data sequence management unit 34 issues the request, it provides the security hardware with a type attribute specifying whether the request is issued for original data as 'original' or original data as 'copy'. When the request is issued for original data as 'copy', it also provides the logical ID of the original data as 'original' from which the copy was generated.

P3: Generating a logical ID

The security hardware comprises the encrypting unit 38, the key storage unit 39, the ID generation unit 40, the time generation unit 41, the device ID storage unit 42, and the incremental counter 43 shown in FIG. 4.

The ID generation unit 40 generates an original data sequence ID 61 from the device ID stored by the device ID storage unit 42 and the counter value stored by the incremental counter 43, and generates a time stamp 63 from the time value output by the real time clock (RTC) in the time generation unit 41. The information is linked to a type attribute 62 specified by the original data sequence management unit 34 to generate a logical ID. In the case of original data as 'copy', the original data sequence ID and the time stamp contained in the logical ID of the provided original data as 'original' are inherited, thereby generating a logical ID.

P4: Signature in the SA

The encrypting unit 38 generates a digital signature of the SA for the information linked in the P3 above using an individual key 64 of the SA stored in the key storage unit 39. The digital signature of the SA corresponds to the MAC (message authentication code) generated by the individual key 64. The encrypting unit 38 links the value of the MAC to the information linked in the P3 above, and generates a final logical ID 66 logically identifying an electronic document. In FIG. 14, the SA enclosed by the circle indicates that the generated information contains a digital signature of the SA.

P5: Returning a Logical ID

The encrypting unit 38 returns to the original data sequence management unit 34 the logical ID 66 as a process result of the security hardware in response to the request to generate a logical ID.

P6: Storing an electronic document

The file system contains the document storage unit 36 and the physical ID generation unit 37. The original data sequence management unit 34 stores an electronic document using the returned logical ID 66 as a file name in the document storage unit 36 in the file system.

P7: Request to generate an ID

The original data sequence management unit 34 requests the security hardware to generate an ID. At this time, a physical ID 67 is obtained from the physical ID generation unit 37, and the logical ID 66 and the physical ID 67 are provided for the security hardware.

P8: Signature of the SA

The encrypting unit 38 generates a signature of the SA for the information obtained by linking the logical ID 66 with the physical ID 67. Then, an ID 68 is generated by linking the signature of the SA with the information obtained by linking the logical ID 66 with the physical ID 67.

P9: Returning an ID

The encrypting unit 38 returns the ID 68 as a process result of the security hardware in response to a request to generate an ID.

P10: Storing an ID as the management information

The ID 68 is stored as the management information about electronic original data.

Figure 15:
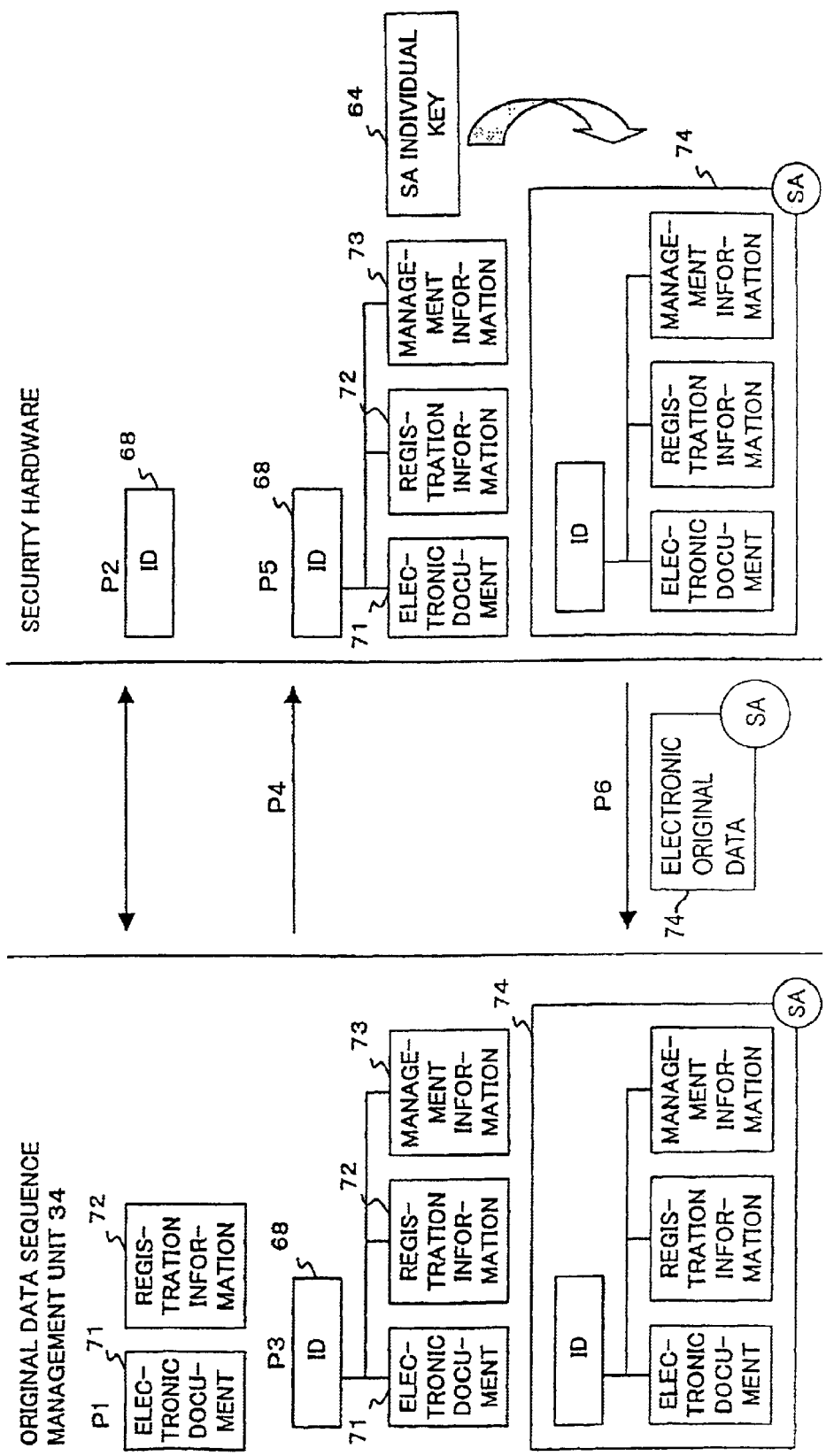
FIG. 15 shows the storage of electronic documents.

FIG. 15 shows the operation of storing an electronic document in the SA. In this example, the process is performed in the following procedure.

P1: The original data sequence management unit 34 obtains an electronic document 71 and registration information 72 from a client, and instructs the security hardware to generate an ID. The registration information 72 contains a user ID and the name of the electronic document of the user.

P2: The security hardware generates the ID 68, and returns it to the original data sequence management unit 34.

P3: The original data sequence management unit 34 associates the electronic document 71, the registration information 72, and management information 73 with the ID 68, and links these pieces of information. The management information 73 contains the SA connection destination information.

P4: The original data sequence management unit 34 instructs the security hardware to generate forgery detection information. At this time, it provides the security hardware with the information obtained by linking the electronic document 71, the registration information 72, and the management information 73.

P5: The security hardware generates a signature of the SA using the individual key 64 of the SA in response to the received information. Then, it adds the generated signature as the forgery detection information to the management information, and generates electronic original data 74.

P6: The security hardware returns the electronic original data 74 as a process result.

P7: The original data sequence management unit 34 registers the electronic original data 74 as the original data in the file system as 'original'.

Figure 16:
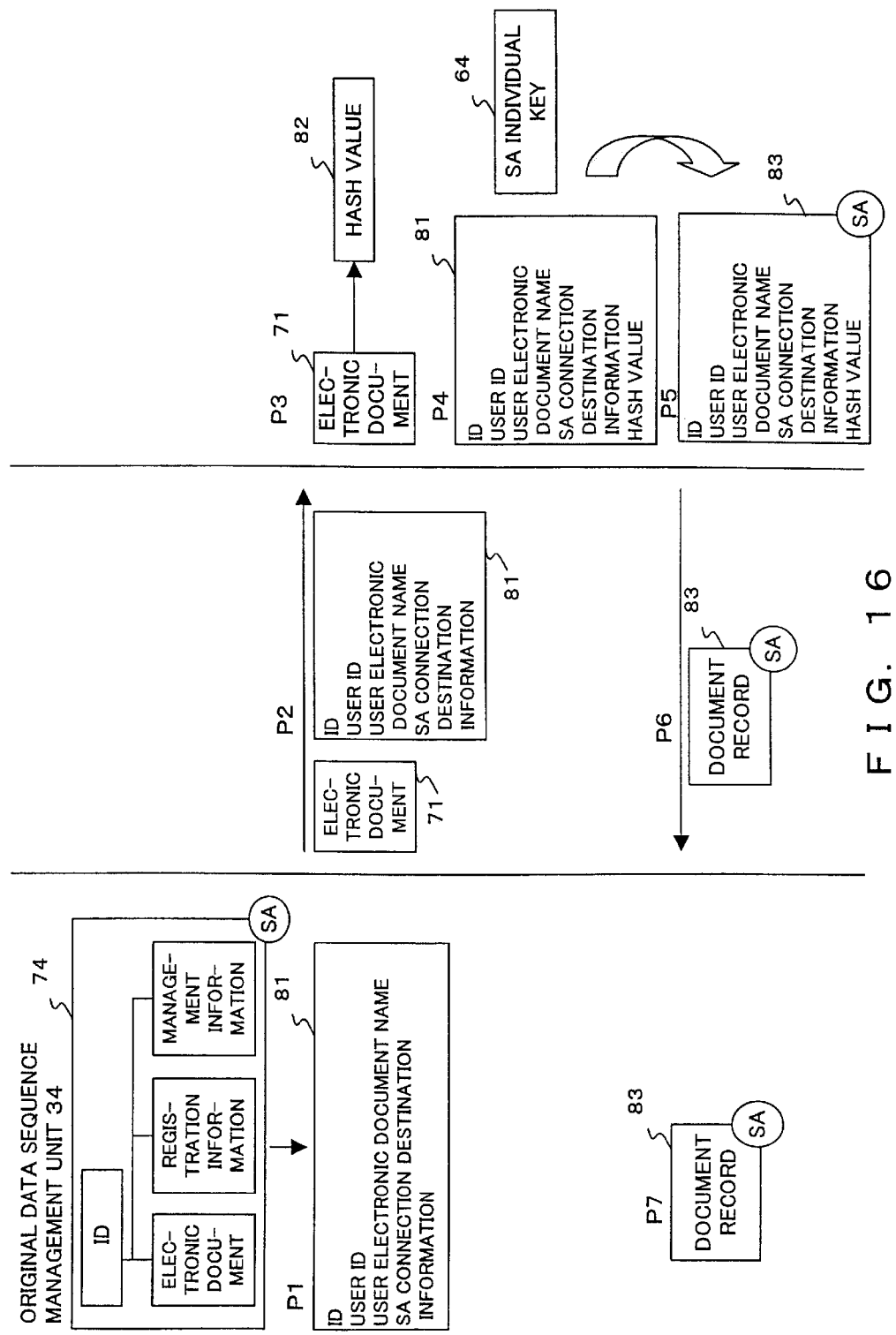
FIG. 16 shows the generation of document records.

FIG. 16 shows the operation of generating a document record. In this example, the process is performed in the following procedure.

P1: Formatting document record information

The original data sequence management unit 34 obtains from the management information about the electronic original data 74 the ID and the SA connection destination information, obtains from the registration information about the electronic original data 74 the user ID and the name of the electronic document of the user, and transmits the obtained information to the registration certificate generation unit 35 shown in FIG. 4. The registration certificate generation unit 35 formats the received information as document record information 81, and returns it to the original data sequence management unit 34.

P2: Instruction to generate a document record

The original data sequence management unit 34 provides the electronic document 71 and document record information 81 for the security hardware, and instructs it to generate a document record.

P3: Computing a hash value

The encrypting unit 38 in the security hardware computes a hash value 82.

P4: Linking a hash value

The encrypting unit 38 links the hash value 82 to the document record information 81.

P5: Generating forgery detection information

The encrypting unit 38 generates forgery detection information using the individual key 64 as in the process shown in FIG. 15, links the forgery detection information to the document record information 81, and generates a document record 83.

P6: Returning a document record

The encrypting unit 38 returns the document record 83 as a process result to the original data sequence management unit 34.

P7: The original data sequence management unit 34 transmits the document record 83 to a client.

Described below are the basic functions of the SA, that is, the registering, retrieving, document record verifying, identity verifying, updating, moving, check-out/check-in, and state transition obtaining processes.

FIG. 17 shows an operation of registering an electronic document. Registering refers to a process performed by registering an electronic document generated by a client as original data in the SA. In this example, the process is performed in the following procedure.

P1: A client generates an electronic document 71 having a file name 91, and generates service-dependent information as the registration information 72, for example, the attribute such as 'confidential', etc., and the storage period.

P2: The client encrypts the file name 91, electronic document 71, and the registration information 72 using a session key between the client and the SA, and transmits the result to the SA. In FIG. 17, the character 'S' enclosed by the circle indicates that the information is encrypted using the session key.

P3: The SA decodes the received information, automatically generates management information containing an ID, a generation date, forgery detection information, etc., links the generated information with the electronic document 71 and the registration information 72, and generates the electronic original data 74.

P4: The SA issues the document record 83 as a registration result. The document record 83 contains the information as shown in FIG. 16. In the information, the SA connection destination information can be, for example, an alias of the SA. Basically, other processes are performed using the document record 83.

P5: The SA encrypts the document record 83 using the session key, and notifies the clients of the encryption.

P6: The client decodes the received information, and updates the information with the file name 91 associated with the document record 83.

Figure 18:
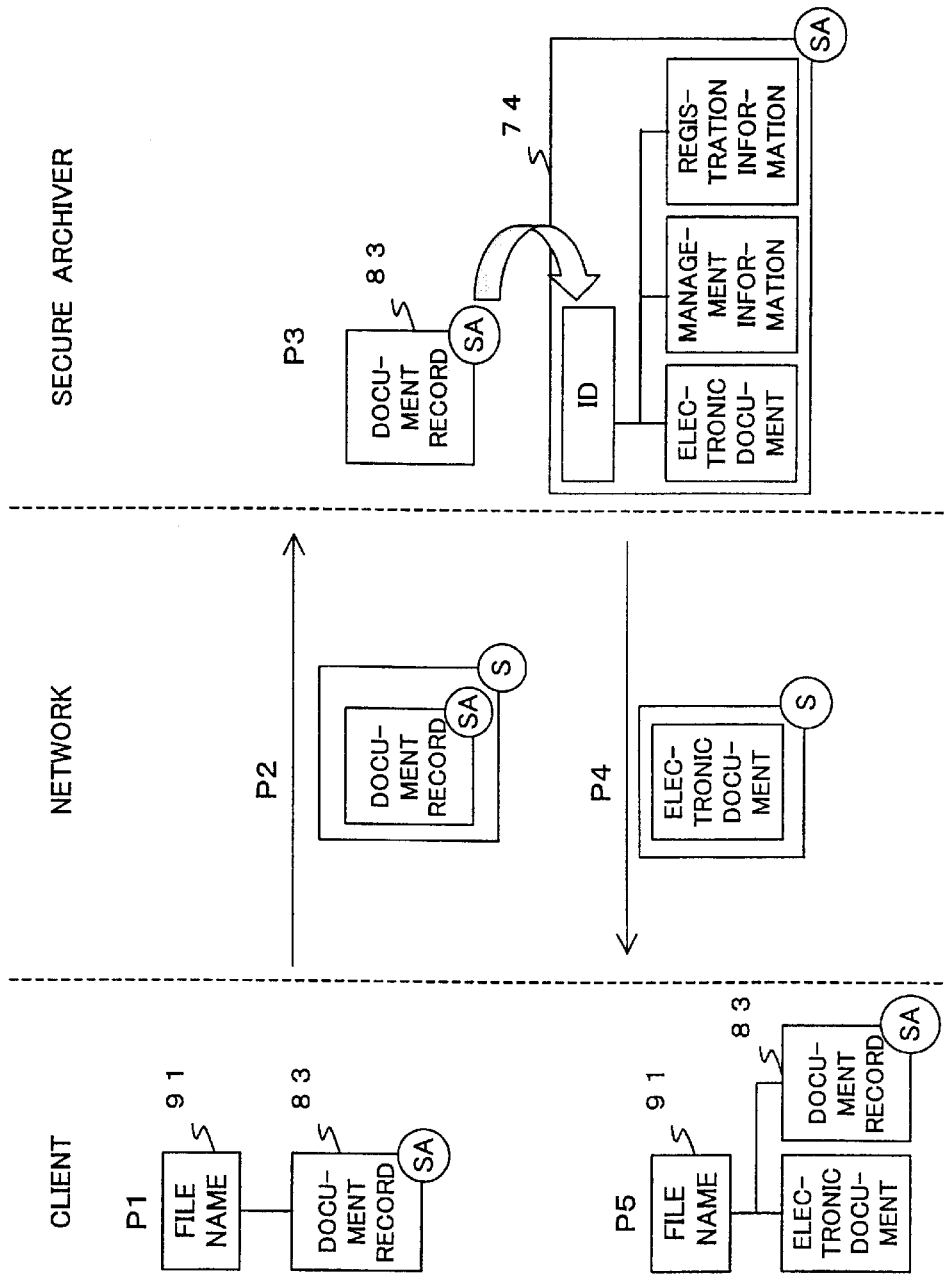
FIG. 18 shows the retrieving process.

FIG. 18 shows an operation of retrieving (referring to) an electronic document. Retrieving refers to extracting an electronic document stored in the SA using the information (ID) of a document record as a key. In this example, the process is performed in the following procedure.

P1: A client selects the document record 83 of an electronic document to be retrieved, and confirms the SA to be accessed according to the connection destination information.

P2: The client transmits the document record 83 to the SA.

P3: The SA retrieves the electronic original data 74 using the ID of the document record 83 as a key.

P4: The SA notifies the client of the electronic document of the retrieved electronic original data 74.

P5: The client updates the information with the received electronic document associated with the file name 91.

Figure 19:
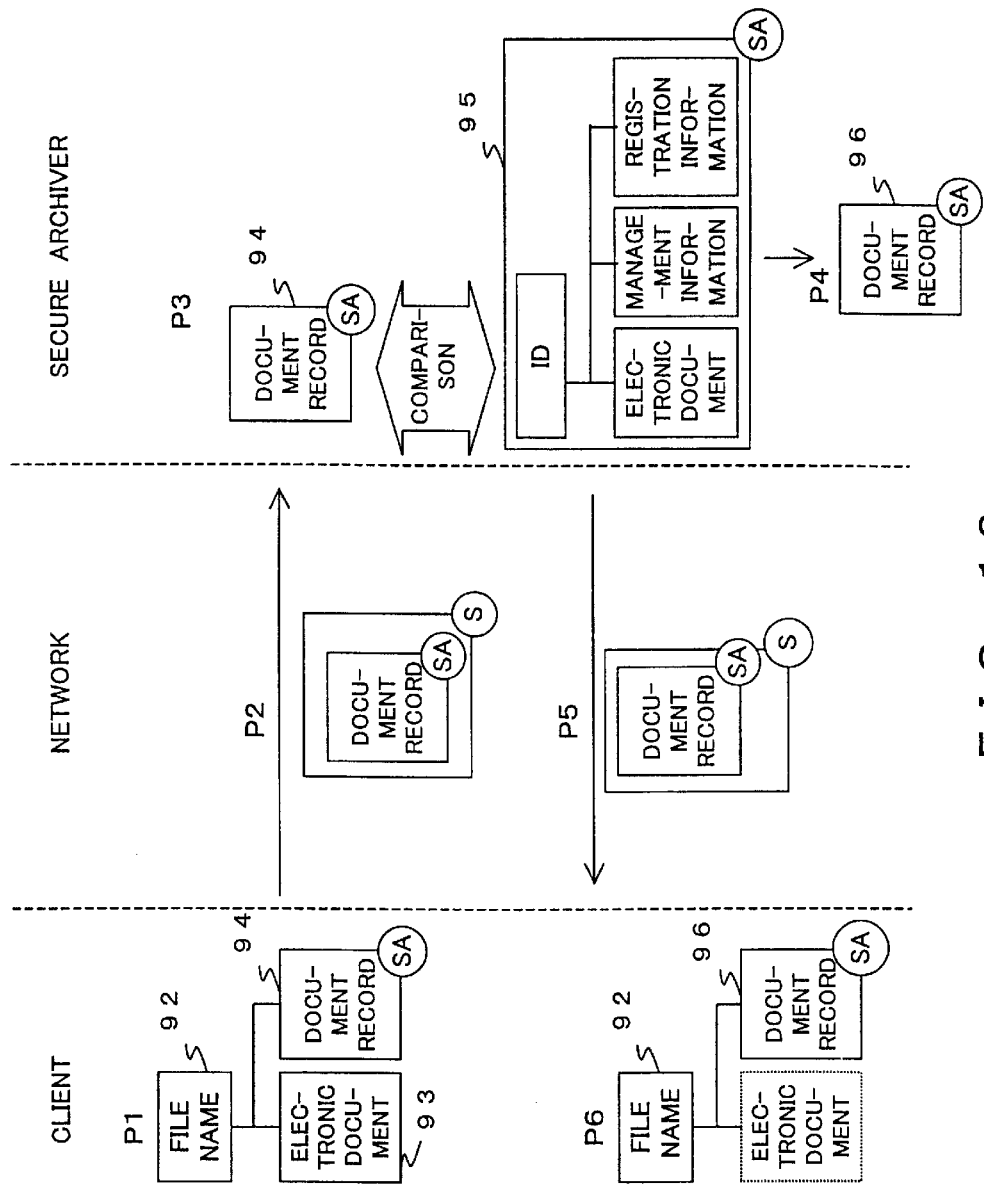
FIG. 19 shows the document record verifying process.

FIG. 19 shows an operation of verifying a document record. Verifying a document record refers to checking whether or not the document record stored by the client is the latest record. In FIG. 19, the state of the electronic original data in the SA has been changed by an updating process, etc., and the latest document record is newly given. In this example, the process is performed in the following procedure.

P1: A client selects an electronic document to be verified. In this example, an electronic document 93 having a file name 92 is selected.

P2: The client transmits a document record 94 of the electronic document 93 to the SA.

P3: The SA extracts an original data sequence ID from the ID of the document record 94 transmitted from the client, and retrieves electronic original data 95 whose time stamp is the latest in the original data sequence corresponding to the original data sequence ID. Then, it compares the ID of the electronic original data 95 with the ID of the document record 94. If they match each other, the document record 94 is the latest record. If they do not match each other, the state of the electronic original data has been changed.

P4: The SA detects that the state of the electronic original data has been changed, and generates the latest document record 96.

P5: The SA notifies the client of the latest document record 96.

P6: The client updates the information with the obtained document record 96 associated with the file name 91. When the latest electronic document is obtained afterwards, an electronic document is obtained in the retrieving process shown in FIG. 18 using the document record 96.

Figure 20:
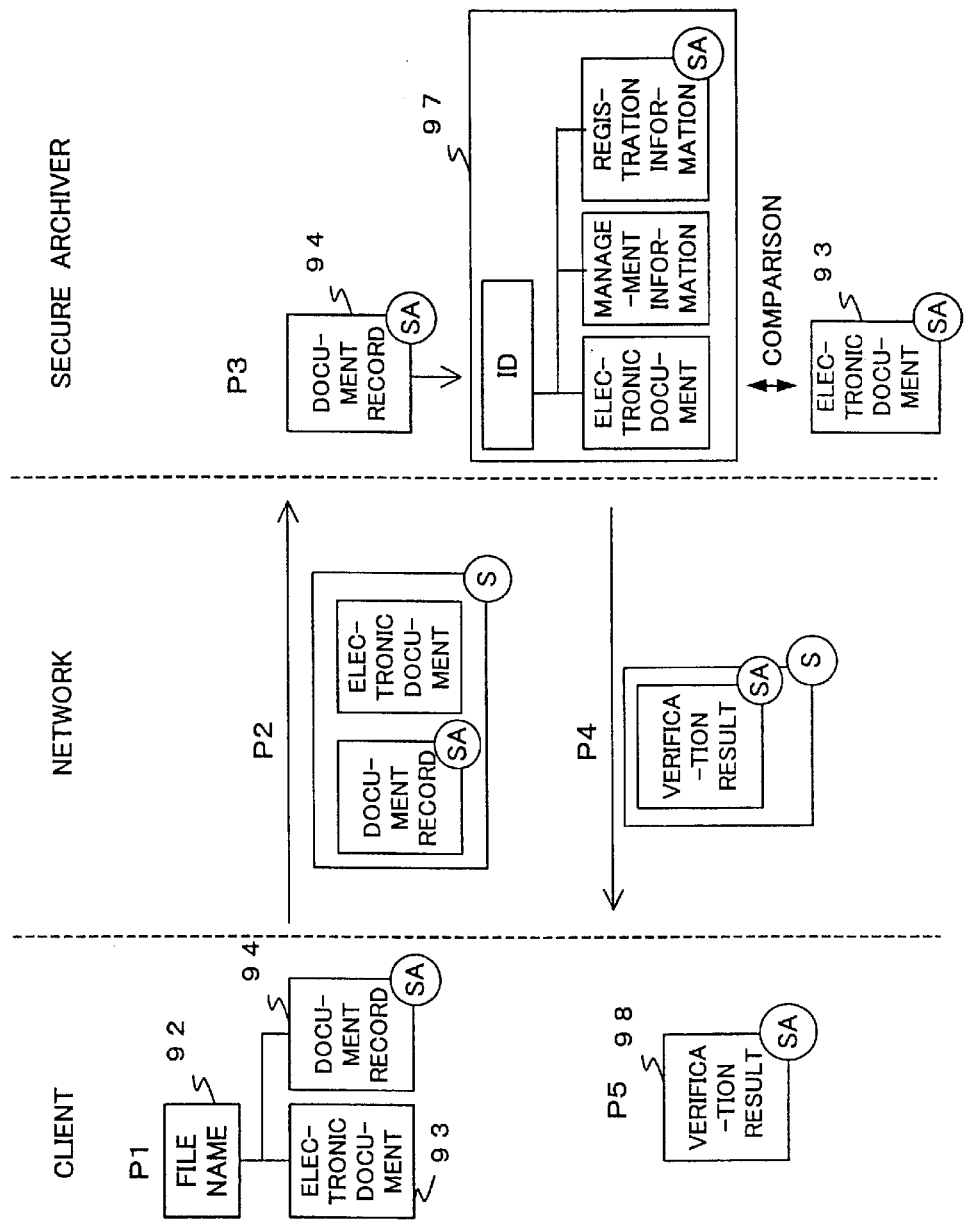
FIG. 20 shows the identity verifying process.

FIG. 20 shows an operation of verifying the identity. Verifying the identity refers to checking whether or not the electronic document stored by the client matches the electronic original data in the SA. In this example, the process is performed in the following procedure.

P1: A client selects the electronic document 93 to be verified and the document record 94.

P2: The client transmits the document record 94 and the electronic document 93 to the SA.

P3: The SA computes the forgery detection information about the electronic document 93 transmitted from the client, compares the result with the forgery detection information about electronic original data 97 in the SA indicated by the document record 94, and checks whether or not they match each other.

P4: The SA puts a signature on a verification result 98, and notifies the client of the result.

P5: The client confirms the verification result 98.

Figure 21:
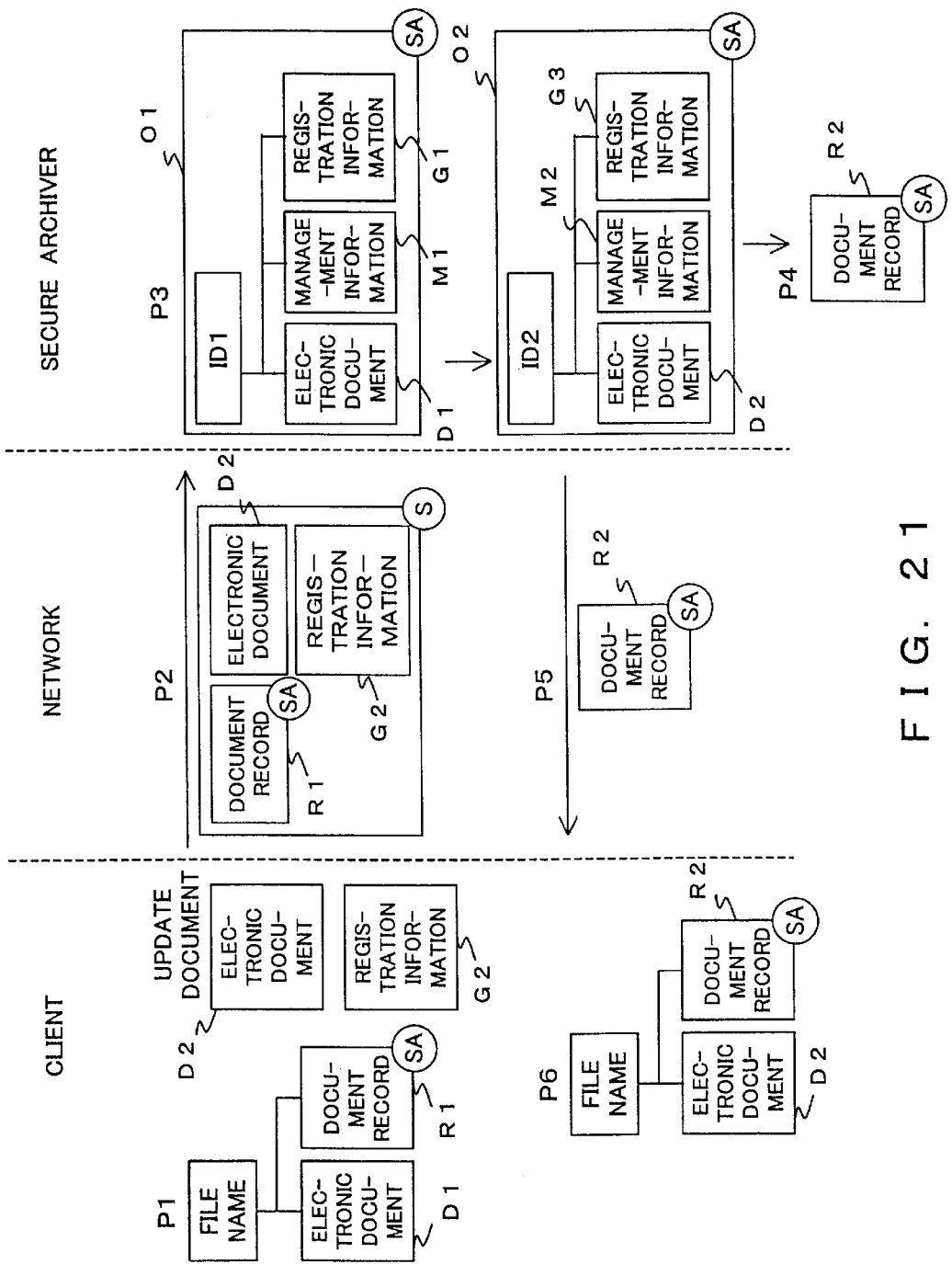
FIG. 21 shows the updating process.

FIG. 21 shows an operation of updating an electronic document. Updating refers to associating an electronic document of the client corresponding to the electronic document in the SA with the electronic document in the SA as an update document. In this example, the process is performed in the following procedure.

P1: A client generates the electronic document D2 as an update document, and selects the document record R1 of the electronic document D1, the electronic document D2, and the registration information G2 relating to the electronic document D2.

P2: The client transmits the document record R1, the electronic document D2, and the registration information G2 to the SA.

P3: The SA obtains the electronic original data O1 corresponding to the document record R1, updates the time stamp portion of the ID1 which is the ID of the electronic original data, and generates an ID2 as a new ID. Then the electronic document D2 is associated with the ID2, thereby generating electronic original data O2. At this time, management information M1 and the registration information G1 of the electronic original data O1 are updated to management information M2 and G3 respectively. The registration information G3 contains the registration information G1 and the registration information G2.

P4: The SA generates the document record R2 of the updated electronic original data O2.
P5: The SA notifies the client of the document record R2.
P6: The client updates the information with the document record R2 associated with the file name of the electronic document D2.

Figure 22:
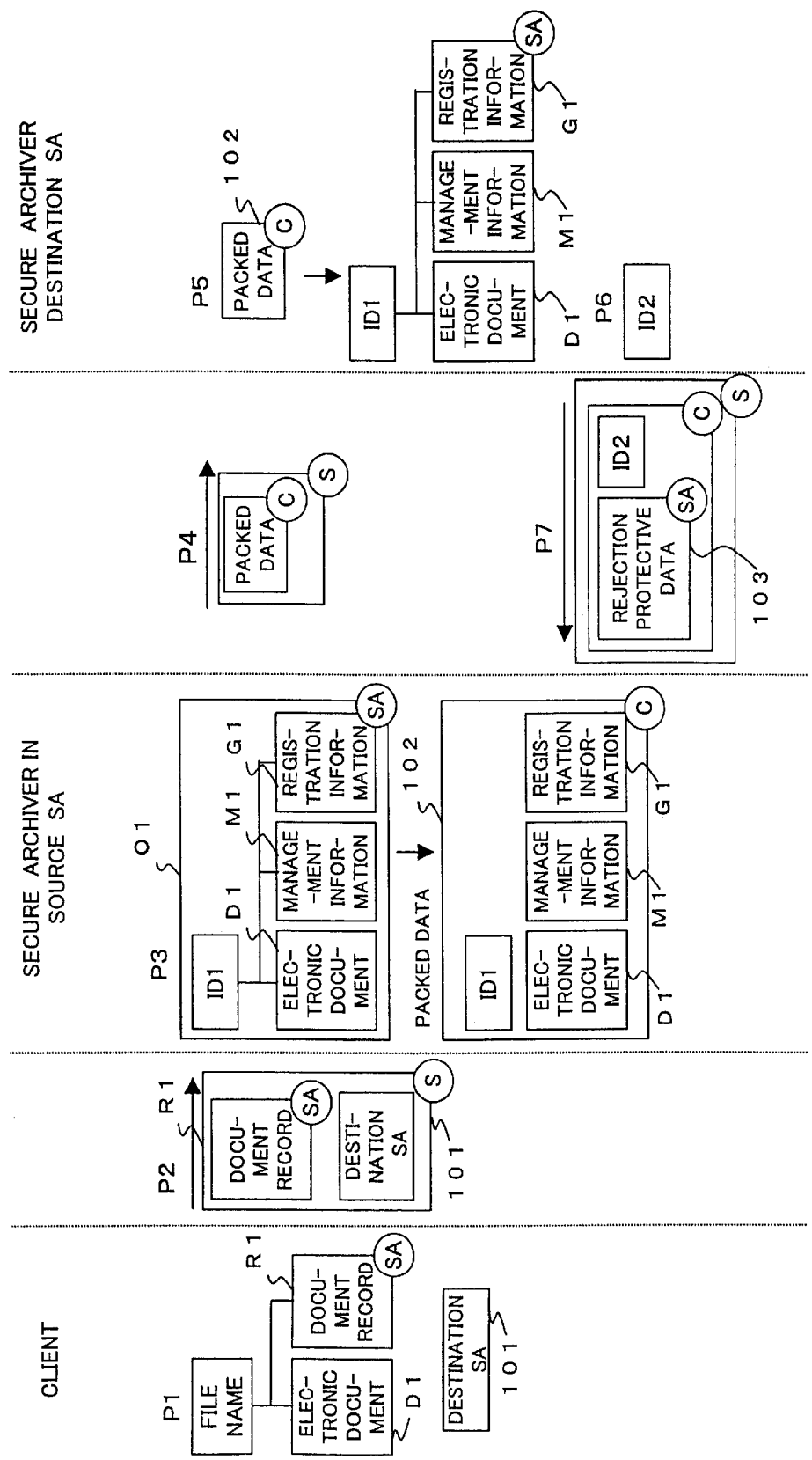
FIG. 22 shows the moving process (1)
Figure 23:
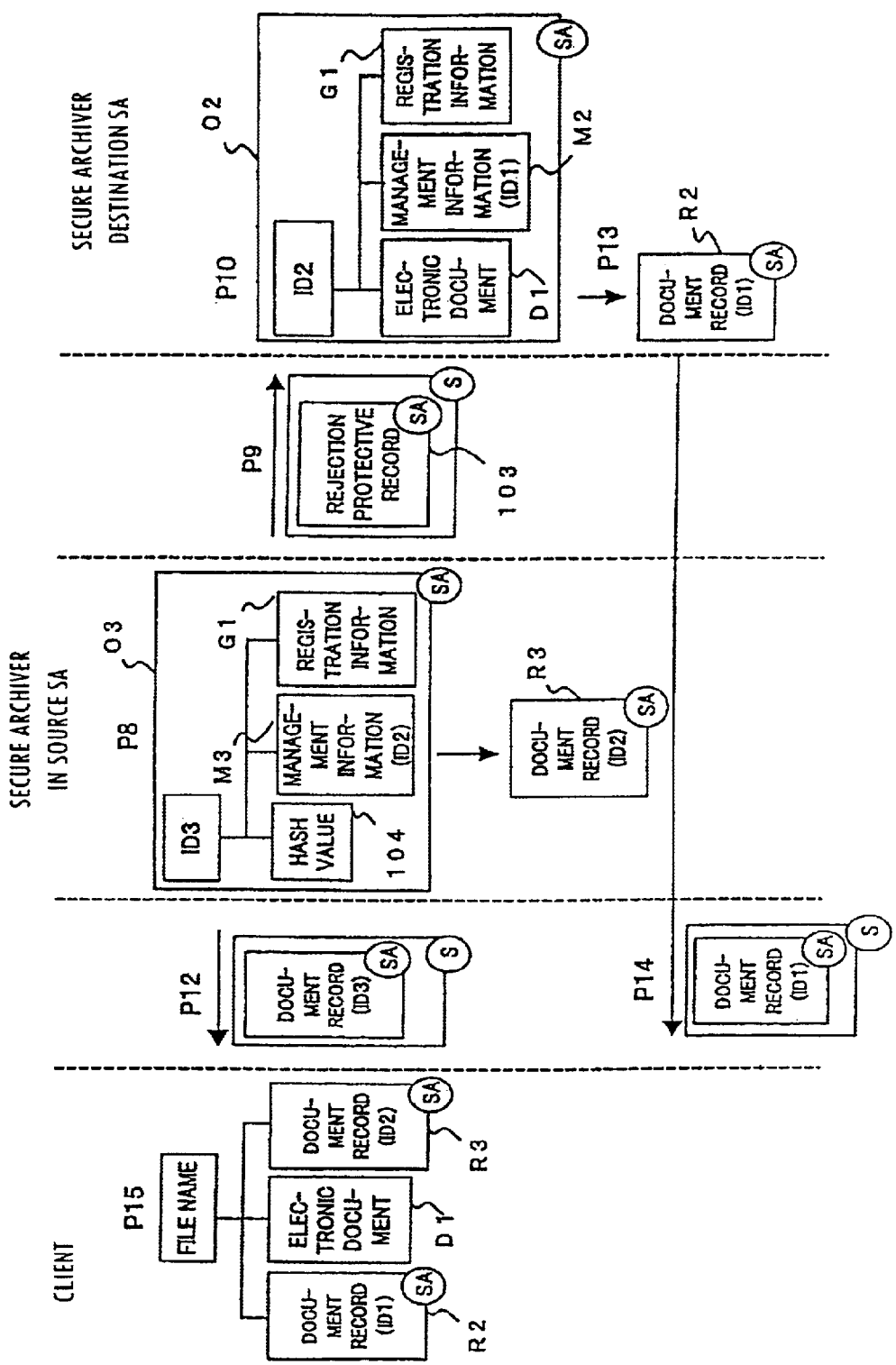
FIG. 23 shows the moving process (2)

FIGS. 22 and 23 shows an operation of moving an electronic document. Moving refers to moving an electronic document from an SA to another SA. The information about the electronic document in the source SA can be maintained or deleted depending on the type of service. In this example, the information about the electronic document in the source SA is maintained. The process is performed in the following procedure.

P1: The client selects the electronic document D1 to be moved and the destination SA. The list of destination SAs is shown by the source SA as necessary.
P2: The client transmits the document record R1 of the electronic document D1, and information 101 specifying the destination SA to the source SA.
P3: The source SA performs an exporting process on the electronic document D1 of the electronic original data O1 indicated by the document record R1. first, the electronic document D1 having the ID1, the management information M1, and the registration information G1 are linked. Then, forgery detection information is generated on the linked data using a common key (an individual common key, a group common key, etc.), which is shared between the destination SA and the source SA and indicated by the character 'C' enclosed by the circle. The forgery detection information is linked with the original linked data to generate packed data 102.
P4: The source SA transmits the packed data 102 to the destination SA.
P5: The destination SA verifies that there is not the forgery of the packed data 102, and performs the importing process. In this process, the packed data 102 is unpacked, and the electronic document D1, the management information M1, and the registration information G1 are extracted.
P6: The destination SA updates the time stamp and the physical ID of the ID1 to generate an ID2 having a different time stamp and physical ID.
P7: The destination SA transmits a rejection protective data 103 and the ID2 to the source SA as a rejection protecting process by the 3-way handshake.
P8: The source SA generates an ID3 by updating the time stamp of the received ID2, and registers a hash value 104 of the electronic document D1 as the information (electronic original data 03) about the moved electronic document with the ID3 associated with the hash value 104. The electronic original data 03 contains the management information M3 to which the ID2, which is the ID of the destination SA, is added, and the registration information G1.
P9: The source SA transmits the rejection protective data 103 to the destination SA as a rejection protecting process by the 3-way handshake.
P10: The destination SA registers the electronic document D1, associated with the ID2, as a moved electronic document (electronic original data O2). The electronic original data O2 contains the management information M2 to which the ID1, which is the ID of the source SA, is added, and the registration information G1.
P11; The source SA generates a document record R3 containing the information about the ID2.
P12: The source SA transmits the document record R3 to the client.
P13: The destination SA generates the document record R2 containing the ID1.
P14: The destination SA transmits the document record R2 to the client.
P15: The client updates the information with the document records R2 and R3 associated with the file name of the electronic document D1.

Figure 24:
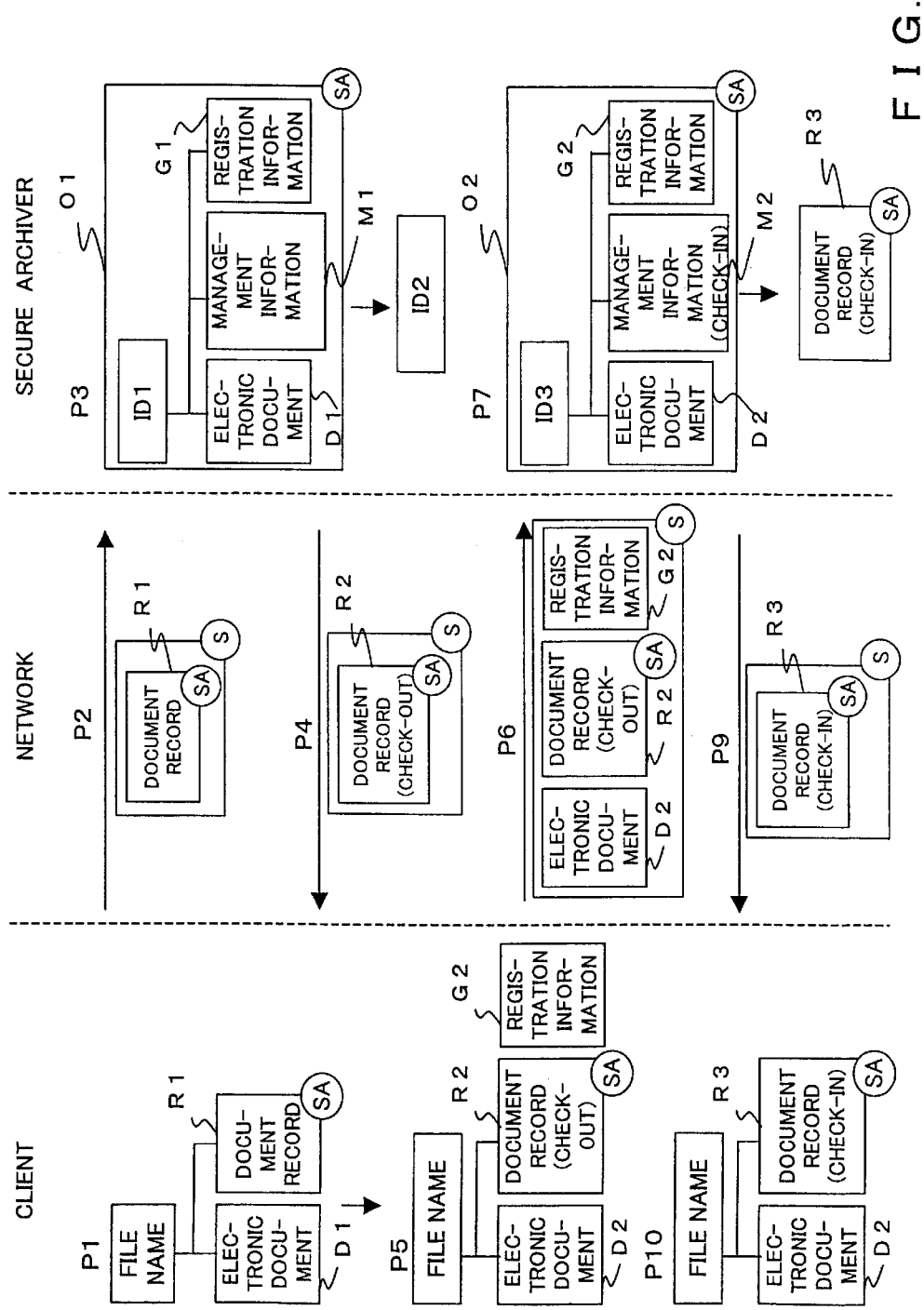
FIG. 24 shows the check-out/check-in process.

FIG. 24 shows an operation of the check-out and check-in process. The check-out refers to the process of locking the original data registered in the SA at a request from a user, and suppressing a change in state of the original data until a check-in request is issued. The check-in refers to the process of releasing the lock of the original data at a request from a user. In this example, the process is performed in the following procedure.

P1: The client selects the electronic document D1 to be checked out.
P2: The client transmits the document record R1 of the electronic document D1 to the SA, and requests a check-out.
P3: The SA performs a check-out process. First, a check-out attribute is assigned to the management information M1 of the electronic original data O1 containing the electronic document D1, and the time stamp of the ID1 is updated, thereby generating the ID2 having a different time stamp. Then, the document record R2 having the check-out attribute is generated.
P4: The SA notifies the client of the document record R2.
P5: The client updates the electronic document D1 to the electronic document D2. This updating process can be performed not only in the client but also on the electronic document having the ID2 in the SA using the updating function. In addition, the updating process can be performed plural times.
P6: The client transmits the document record R2, the final electronic document D2, the registration information G2 about the electronic document D2 to the SA, thereby requesting a check-in process.
P7: The SA performs the check-in process. First, the time stamp of the ID2 is updated to generate the ID 3, and a check-in attribute is assigned to the management information Ml to generate the management information M2. Then, the electronic document D2 is registered as the electronic original data O2.
P8: The SA generates the document record R3 having a check-in attribute.
P9: The SA notifies the client of the document record R3.
P10: The client updates the information with the document record R3 associated with the file name of the electronic document D2.

Figure 25:
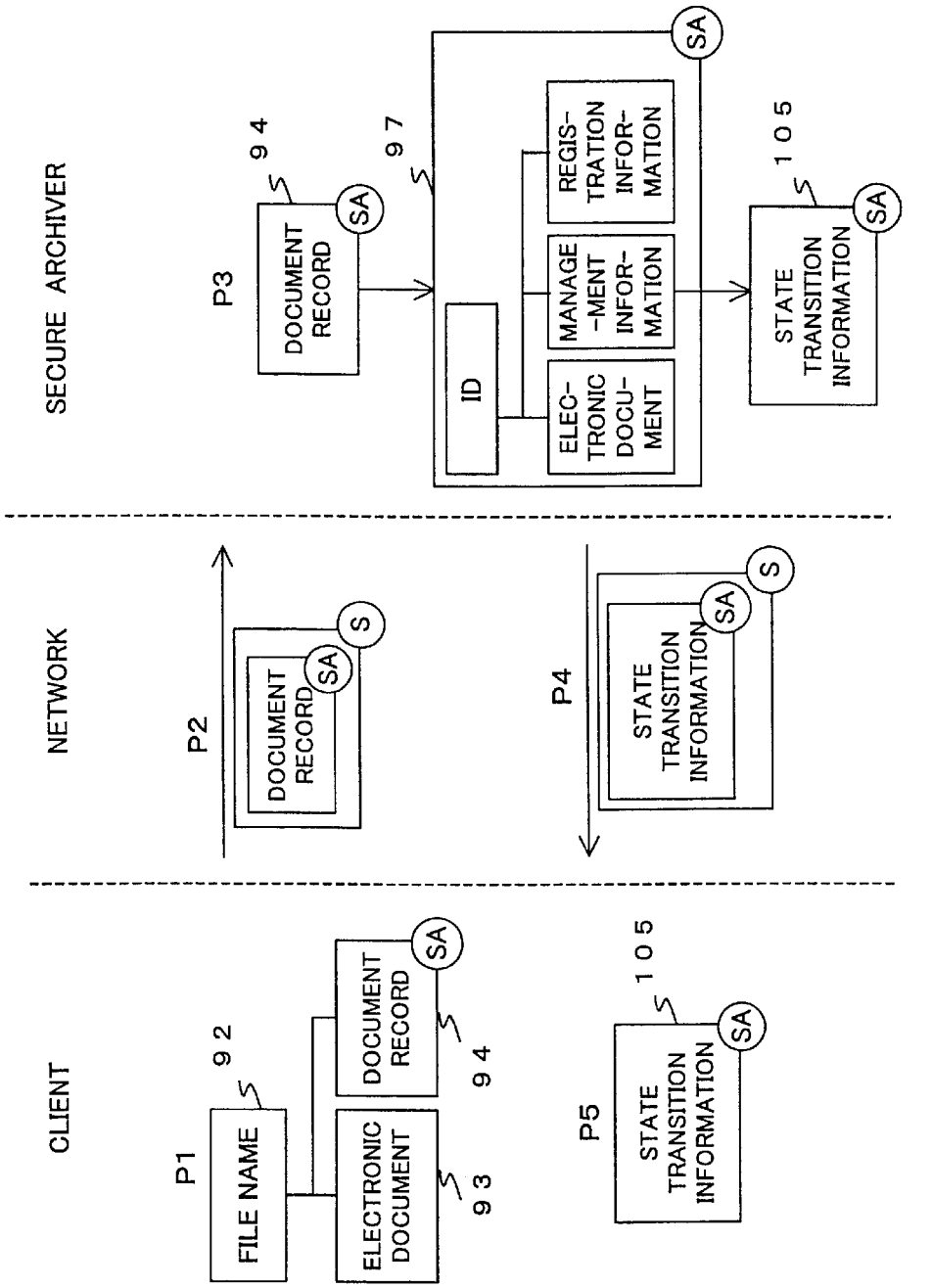
FIG. 25 shows the state transition obtaining process.

FIG. 25 shows an operation of obtaining a state transition. Obtaining a state transition refers to obtaining state transition information indicating how the state of the electronic original data specified by a document record has been changed. The state transition information corresponds to the history of an operation performed on electronic original data, and is stored as a part of the management information.

P1: A client selects the electronic document 93 whose state transition information is to be obtained.
P2: The client transmits the document record 94 of the electronic document 93 to the SA.
P3: The SA obtains state transition information 105 from the latest management information about the electronic original data 97 in the SA specified by the document record 94.
P4: The SA notifies the client of the state transition information 105.
P5: The client confirms the contents of the state transition information 105.

FIG. 26 shows an example of state transition information. The state transition information records that a user A registered the original data in the SA 1 at 12:00 on Feb. 17 in 1998, a user B moved the original data from the SA 1 to the SA 2 at 14:00, a user C made a copy of the original data at 15:00, and a user D moved the original data from the SA 2 to the SA 3 at 16:00. Therefore, the users can trace the state of the electronic original data from the registration to the present state by referring to the state transition information.

According to the above described embodiment, an electronic important document is registered in the SA as an electronic document. In addition, any electronic information in any format can be registered in the SA. For example, voice data, image data, video data, etc. are registered to be managed in a process similar to the process performed on an electronic document.

The SA 11, the SA 21, the service client 12, and the user terminal 22 shown in FIG. 3 can be configured by, for example, the information processing apparatus (computer) as shown in FIG. 27. The information processing apparatus shown in FIG. 27 comprises a CPU 111, a memory 112, an input device 113, an output device 114, an external storage device 115, a medium drive device 116, and a network connection device 117, and these units are interconnected through a bus 118.

The memory 112 contains, for example, ROM (read only memory), RAM (random access memory), etc., and stores a program and data used in a process. For example, the original data sequence management unit 34 and the registration certificate generation unit 35 are stored as program modules in the memory 112. The CPU 111 performs a necessary process by executing a program, using the memory 112.

The input device 113 can be, for example, a keyboard, a pointing device, a touch panel, etc., and is used to input an instruction and information from a user or an administrator. The output device 114 can be, for example, a display, a printer, a speaker, etc., and is used to output an inquiry and a process result to a user or an administrator.

The external storage device 115 can be, for example, a magnetic disk device, an optical disk device, a magneto-optical disk device, etc. The information processing device stores the above described program and data in the external storage device 115 so that they can be loaded onto the memory 112 for use as necessary. The external storage device 115 can also be used as the document storage unit 36 and the physical ID generation unit 37 shown in FIG. 4.

The medium drive device 116 drives a portable storage medium 119, and accesses the stored contents. The portable storage medium 119 can be any computer-readable storage medium such as a memory card, a floppy disk, CD-ROM (compact disk read only memory), an optical disk, a magneto-optical disk, etc. A user stores the above described program and data in the portable storage medium 119, and can load them onto the memory 112 for use as necessary. In addition, the portable storage medium 119 can be used as the secure medium 16 shown in FIG. 3.

The network connection device 117 communicates with an external device through any network (line) such as a LAN (local area network), etc. to exchange data for use in communications. The information processing device receives the above described program and data through the network connection device 117 as necessary, and loads them onto the memory 112 and uses them. The network connection device 117 corresponds to, for example, the network interface 31 shown in FIG. 4.

Figure 28:
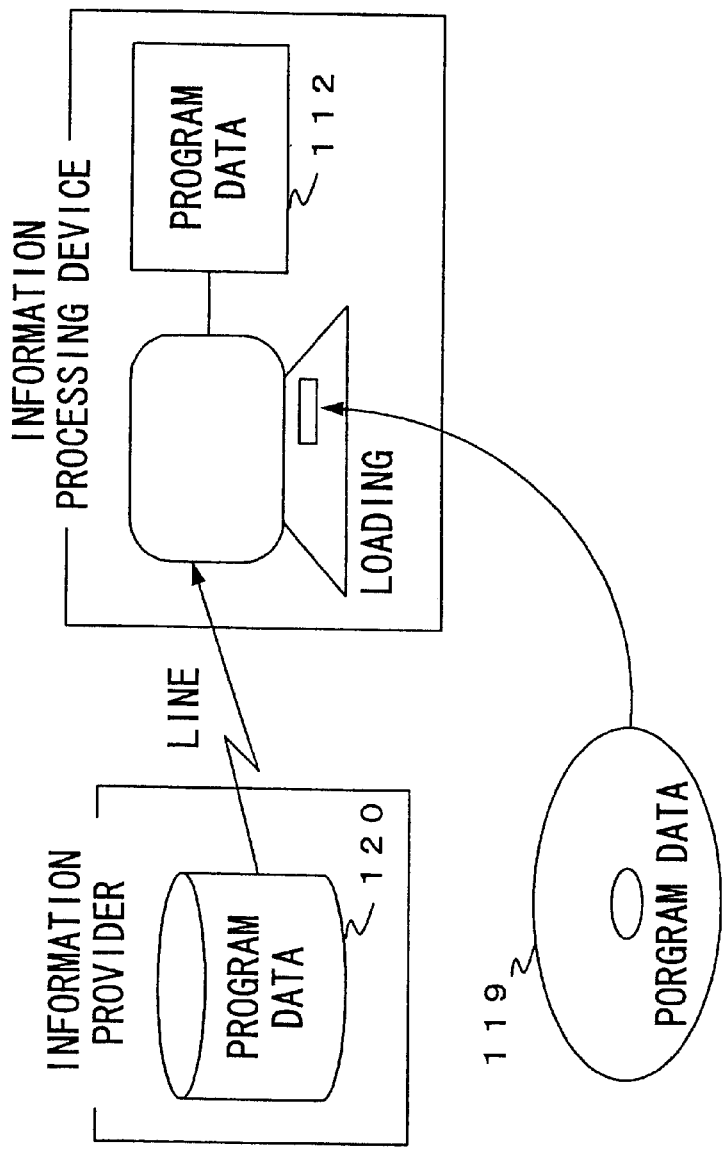
FIG. 28 shows storage media.

FIG. 28 shows computer-readable storage media for providing a program and data for the information processing device shown in FIG. 27. The program and data stored in the portable storage medium 119 and a database 120 are loaded onto the memory 112. Then, the CPU 111 executes the program using the data, and performs a necessary process.

According to the present invention, an electronic original data management apparatus is provided in addition to the computer environment used by a user so that an electronic document can be registered, updated, moved, etc. using a registration certificate issued by the electronic document management apparatus. Thus, the electronic document can be assigned security (originality) at a level equal to or higher than the security level of a paper medium.

What is claimed is:

1. An electronic original data management apparatus, comprising:
    a registration device registering electronic information as original data information;
    an assignment device assigning, to the electronic information, logical identification information for identifying the electronic information uniquely in logic, and location identification information indicating a physical location of the electronic information;
    a management device managing the original data information using combination identification information based on a combination of the logical identification information and the location identification information; and
    an issue device issuing registration certificate information containing the combination identification information, and used for access to the original data information and distinguishing the original data information from a copy of the original data information.

2. The apparatus according to claim 1, wherein a user accesses the original data information registered in said electronic original data management apparatus according to the combination identification information contained in the registration certificate information.

3. The apparatus according to claim 1, wherein
    said management device compares the location identification information with the physical location at which the electronic information is stored, and determines that the electronic information is an illegal copy if the location identification information does not match the physical location.

4. The apparatus according to claim 1, further comprising
    a generation device generating the logical identification information according to identification information of said electronic original data management apparatus, electronic information identification information in said apparatus, type attribute information for distinguishing a copy from an original, and time stamp information, wherein
    said management device manages a combination of the identification information of the electronic original data management apparatus and the electronic information identification information as original data sequence identification information.

5. The apparatus according to claim 4, wherein
    said management device processes all registered electronic information as original data information, and assigns the type attribute information indicating an original to the registered electronic information when a registering process is performed.

6. The apparatus according to claim 4, wherein
    a user determines whether the electronic information is an original or a copy by referring to the type attribute information contained in the registration certificate information.

7. The apparatus according to claim 6, wherein
when the electronic information is a copy, the user determines at which time point the electronic information has been copied by referring to the time stamp information contained in the registration certificate information.

8. An electronic original data management apparatus, comprising:

a registration device to register electronic information as original data information;

a generation device to generate logical identification information for identifying the electronic information uniquely in logic, based on apparatus identification information of said electronic original data management apparatus, an identifier of the electronic information used by said electronic original data management apparatus, type attribute information for distinguishing a copy from an original, and time stamp information;

an assignment device to assign, to the electronic information, the logical identification information, and location identification information indicating a physical location of the electronic information;

an issue device to issue registration certificate information containing combination identification information based on a combination of the logical identification information and the location identification information, and used for access to the original data information; and a management device to manage the original data information using the combination identification information and original data sequence identification information combining the apparatus identification information of the electronic original data management apparatus and the identifier of the electronic information, to process all registered electronic information as original data, to assign the type attribute information indicating an original to the electronic information when a registration process is performed and, when the electronic information is copied, to produce generated logical identification information whose type attribute information is changed to copy attribute information indicating a copy without changing the original data sequence identification information and the time stamp information, and to assign the generated logical identification information to a copy of the electronic information.

9. An electronic original data management apparatus, comprising:

a registration device to register electronic information as original data information;

a generation device to generate logical identification information for identifying the electronic information uniquely in logic, based on apparatus identification information of said electronic original data management apparatus, an identifier of the electronic information used by said electronic original data management apparatus, type attribute information for distinguishing a copy from an original, and time stamp information;

an assignment device to assign, to the electronic information, the logical identification information, and location identification information indicating a physical location of the electronic information;

an issue device to issue registration certificate information containing combination identification information based on a combination of the logical identification information and the location identification information, and used for access to the original data information; and a management device to manage the original data information using the combination identification information and original data sequence identification information combining the apparatus identification information of the electronic original data management apparatus and the identifier of the electronic information and, when the original data information is updated, to change the time stamp information without changing the original data sequence identification information and the type attribute information to manage the original data information before and after update.

10. An electronic original data management apparatus, comprising:

a registration device to register electronic information as original data information;

a generation device to generate logical identification information for identifying the electronic information uniquely in logic, based on apparatus identification information of said electronic original data management apparatus, an identifier of the electronic information used by said electronic original data management apparatus, type attribute information for distinguishing a copy from an original, and time stamp information;

an assignment device to assign, to the electronic information, the logical identification information, and location identification information indicating a physical location of the electronic information;

an issue device to issue registration certificate information containing combination identification information based on a combination of the logical identification information and the location identification information, and used for access to the original data information; and a management device to manage the original data information using the combination identification information and original data sequence identification information combining the apparatus identification information of the electronic original data management apparatus and the identifier of the electronic information, to generate a series of instances of original data information depending on changes in a time series in the original data information, and to process the instances in the time series as one original data sequence.

11. An electronic original data management apparatus, comprising:

a registration device to register electronic information as original data information;

a generation device to generate logical identification information for identifying the electronic information uniquely in logic, based on apparatus identification information of said electronic original data management apparatus, an identifier of the electronic information used by said electronic original data management apparatus, type attribute information for distinguishing a copy from an original, and time stamp information;

an assignment device to assign, to the electronic information, the logical identification information, and location identification information indicating a physical location of the electronic information;

an issue device to issue registration certificate information containing combination identification information based on a combination of the logical identification information and the location identification information, and used for access to the original data information; and a management device to manage the original data information using the combination identification information and original data sequence identification information combining the apparatus identification information of the electronic original data management apparatus and the identifier of the electronic information and, when original data information is moved to said electronic original data management apparatus from another electronic original data management apparatus, to manage the original data information that is moved by changing time stamp information without changing original data sequence identification information and type attribute information about the original data information that is moved.

12. An electronic original data management apparatus, comprising:

a management device generating a series of instances of corresponding original data information depending on changes in a time series of electronic information, and managing the series of the instances as one original data sequence;

an assignment device assigning original data sequence identification information to the original data sequence.

an issue device issuing registration certificate information which contains the original data sequence identification information, and is used for access to an instance in the series of instances.

13. An electronic original data managing method, comprising:

registering electronic information as original data information;

assigning, to the electronic information, logical identification information for identifying the electronic information uniquely in logic, and location identification information indicating a physical location of the electronic information;

managing the original data information using combination identification information based on a combination of the logical identification information and the location identification information; and accessing the original data information according to registration certificate information containing the combination identification information and distinguishing the original data information from a copy of the original data information.

14. An electronic original data managing method, comprising:

generating a series of instances of corresponding original data information depending on changes in a time series of electronic information;

managing the series of the instances as one original data sequence;

assigning original data sequence identification information to the original data sequence; and accessing an instance in the series of instances according to registration certificate information containing the original data sequence identification information.

15. An electronic original data management apparatus, comprising:

registration means for registering electronic information as original data information;

assignment means for assigning, to the electronic information, logical identification information for identifying the electronic information uniquely in logic, and location identification information indicating a physical location of the electronic information;

management means for managing the original data information using combination identification information based on a combination of the logical identification information and the location identification information; and issue means for issuing registration certificate information containing the combination identification information, and used for access to the original data information and distinguishing the original data information from a copy of the original data information.

16. An electronic original data management apparatus, comprising:

management means for generating a series of instances of corresponding original data information depending on changes in a time series of electronic information, and managing the series of the instances as one original data sequence;

assignment means for assigning original data sequence identification information to the original data sequence; and issue means for issuing registration certificate information which contains the original data sequence identification information, and is used for access to an instance in the series of instances.

17. A computer-readable storage medium storing a program for directing a computer to perform a process comprising:

assigning, to electronic information registered as original data information, logical identification information for identifying the electronic information uniquely in logic, and location identification information indicating a physical location of the electronic information;

managing the original data information using combination identification information based on a combination of the logical identification information and the location identification information; and issuing registration certificate information containing the combination identification information for access to the original data information and distinguishing the original data information from a copy of the original data information.

18. A computer-readable storage medium storing a program for directing a computer to perform the process comprising:

generating a series of instances of corresponding original data information depending on changes in a time series of electronic information;

managing the series of the instances as one original data sequence;

assigning original data sequence identification information to the original data sequence; and issuing registration certificate information containing the original data sequence identification information for access to an instance in the series of instances.

* * * * *